United States Patent
Yang et al.

(10) Patent No.: US 10,148,559 B2
(45) Date of Patent: Dec. 4, 2018

(54) METHOD AND SYSTEM FOR HANDLING FAILURE IN A COORDINATED MULTICAST STREAMING SYSTEM

(71) Applicant: Aruba Networks, Inc., Sunnyvale, CA (US)

(72) Inventors: Sheausong Yang, Saratoga, CA (US); Gopalakrishnan Raman, Santa Clara, CA (US); Isaac Theogaraj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 13 days.

(21) Appl. No.: 14/504,830

(22) Filed: Oct. 2, 2014

(65) Prior Publication Data

US 2015/0312140 A1 Oct. 29, 2015

Related U.S. Application Data

(63) Continuation-in-part of application No. 14/261,339, filed on Apr. 24, 2014, now Pat. No. 9,306,801.

(51) Int. Cl.
*H04L 12/703* (2013.01)
*H04L 12/18* (2006.01)
(Continued)

(52) U.S. Cl.
CPC .............. *H04L 45/28* (2013.01); *H04L 12/18* (2013.01); *H04L 12/1863* (2013.01);
(Continued)

(58) Field of Classification Search
CPC ......... H04L 45/28; H04L 45/16; H04L 12/18; H04L 41/0668; H04L 12/703;
(Continued)

(56) References Cited

U.S. PATENT DOCUMENTS

| 5,774,640 A | 6/1998 | Kurio |
| 6,108,300 A | 8/2000 | Coile et al. |

(Continued)

FOREIGN PATENT DOCUMENTS

| WO | WO-2008/008652 A2 | 1/2008 |
| WO | WO-2015164670 | 10/2015 |

OTHER PUBLICATIONS

International Search Report and Written Opinion, International Application No. PCT/US2015/027393, dated: Sep. 23, 2015, pp. 1-20.

*Primary Examiner* — Walli Z Butt
(74) *Attorney, Agent, or Firm* — Hewlett Packard Enterprise Patent Department

(57) ABSTRACT

According to one embodiment of the invention, a non-transitory computer readable medium for handling the failure of a controller within a communications network is provided. One embodiment of the non-transitory computer readable medium comprises instructions that cause a secondary network device to identify one or more multicast streams received by a primary network device and detect that the primary network device has failed; and responsive to detecting that the primary network device has failed, cause the secondary network device to subscribe to the multicast streams.

12 Claims, 20 Drawing Sheets

(51) Int. Cl.
*H04L 12/24* (2006.01)
*H04L 12/761* (2013.01)
*H04W 84/12* (2009.01)

(52) U.S. Cl.
CPC .......... *H04L 41/0668* (2013.01); *H04L 45/16* (2013.01); *H04W 84/12* (2013.01)

(58) Field of Classification Search
CPC ...... H04L 12/24; H04L 12/1863; H04W 4/06; H04W 36/02; H04W 84/12
USPC ............... 370/218, 221, 312, 331, 231, 225; 455/436; 709/220
See application file for complete search history.

(56) References Cited

U.S. PATENT DOCUMENTS

| | | | |
|---|---|---|---|
| 7,487,531 B1 | 2/2009 | Vogel et al. | |
| 8,239,705 B2 | 8/2012 | Qiu et al. | |
| 8,971,173 B1* | 3/2015 | Choudhury | H04L 47/125 |
| | | | 370/216 |
| 2007/0153676 A1* | 7/2007 | Baglin | H04W 24/04 |
| | | | 370/216 |
| 2008/0159141 A1* | 7/2008 | Soukup | H04L 12/1868 |
| | | | 370/235 |
| 2009/0086689 A1* | 4/2009 | Hunt | H04W 28/06 |
| | | | 370/338 |
| 2010/0293043 A1* | 11/2010 | Atreya | G06F 11/2023 |
| | | | 705/14.4 |

* cited by examiner

| 300 | 310 | 320 |
|---|---|---|
| INDEX | PRIMARY CONTROLLER | STANDBY CONTROLLER |
| 1 | CONTROLLER 1 | CONTROLLER 2 |
| 2 | CONTROLLER 2 | CONTROLLER 3 |
| 3 | CONTROLLER 3 | CONTROLLER 1 |
| 4 | CONTROLLER 2 | CONTROLLER 1 |
| 5 | CONTROLLER 1 | CONTROLLER 3 |
| 6 | CONTROLLER 1 | CONTROLLER 2 |
| 7 | CONTROLLER 3 | CONTROLLER 1 |

FIG. 3A

| 301 | 311 | 321 |
|---|---|---|
| INDEX | PRIMARY CONTROLLER | STANDBY CONTROLLER |
| 1 | CONTROLLER 1 | CONTROLLER 2 |
| 2 | CONTROLLER 2 | CONTROLLER 3 |
| 3 | CONTROLLER 3 | CONTROLLER 2   (350) |
| 4 | CONTROLLER 2 | CONTROLLER 3 |
| 5 | CONTROLLER 1 | CONTROLLER 3 |
| 6 | CONTROLLER 1 | CONTROLLER 2 |
| 7 | CONTROLLER 3 | CONTROLLER 2 |

FIG. 3B

| INDEX | PRIMARY CONTROLLER | FIRST STANDBY CONTROLLER | SECOND STANDBY CONTROLLER |
|---|---|---|---|
| 1 | CONTROLLER 1  347 | CONTROLLER 2  348 | CONTROLLER 3  349 |
| 2 | CONTROLLER 2 | CONTROLLER 3 | CONTROLLER 1 |
| 3 | CONTROLLER 3 | CONTROLLER 1 | CONTROLLER 2 |
| 4 | CONTROLLER 2 | CONTROLLER 1 | CONTROLLER 3 |
| 5 | CONTROLLER 1 | CONTROLLER 3 | CONTROLLER 2 |
| 6 | CONTROLLER 1 | CONTROLLER 2 | CONTROLLER 3 |
| 7 | CONTROLLER 3 | CONTROLLER 1 | CONTROLLER 2 |

*FIG. 3D*

| INDEX (600) | PRIMARY CONTROLLER (610) |
|---|---|
| 001 | CONTROLLER_1 |
| 002 | CONTROLLER_2 |
| 003 | CONTROLLER_3 |
| 004 | CONTROLLER_4 |
| 005 | CONTROLLER_1 |
| 006 | CONTROLLER_2 |
| 007 | CONTROLLER_3 |
| 008 | CONTROLLER_4 |
| ... | ... |
| 253 | CONTROLLER_1 |
| 254 | CONTROLLER_2 |
| 255 | CONTROLLER_3 |
| 256 | CONTROLLER_4 |

FIG. 6A

| INDEX (620) | PRIMARY CONTROLLER (630) |
|---|---|
| 001 | CONTROLLER_1 |
| 002 | CONTROLLER_2 |
| 003 | CONTROLLER_2 |
| 004 | CONTROLLER_1 |
| 005 | CONTROLLER_4 |
| 006 | CONTROLLER_1 |
| 007 | CONTROLLER_3 |
| 008 | CONTROLLER_2 |
| ... | ... |
| 253 | CONTROLLER_4 |
| 254 | CONTROLLER_3 |
| 255 | CONTROLLER_1 |
| 256 | CONTROLLER_2 |

FIG. 6B

| INDEX (800) | PRIMARY CONTROLLER (810) | STANDBY CONTROLLER (820) |
| --- | --- | --- |
| 1 | CONTROLLER 1 | |
| 2 | CONTROLLER 2 | |
| 3 | CONTROLLER 3 | |
| 4 | CONTROLLER 2 | |
| 5 | CONTROLLER 1 | |
| 6 | CONTROLLER 1 | |
| 7 | CONTROLLER 3 | |

FIG. 8A

| INDEX (801) | PRIMARY CONTROLLER (811) | STANDBY CONTROLLER (821) |
| --- | --- | --- |
| 1 | CONTROLLER 1 | CONTROLLER 2 (850) |
| 2 | CONTROLLER 2 | |
| 3 | CONTROLLER 3 | |
| 4 | CONTROLLER 2 | |
| 5 | CONTROLLER 1 | CONTROLLER 3 |
| 6 | CONTROLLER 1 | CONTROLLER 2 |
| 7 | CONTROLLER 3 | |

FIG. 8B

| INDEX (802) | PRIMARY CONTROLLER (812) | STANDBY CONTROLLER (822) |
| --- | --- | --- |
| 1 | CONTROLLER 2 | |
| 2 | CONTROLLER 2 | |
| 3 | CONTROLLER 3 | |
| 4 | CONTROLLER 2 | |
| 5 | CONTROLLER 3 | |
| 6 | CONTROLLER 2 | |
| 7 | CONTROLLER 3 | |

FIG. 8C

| INDEX (803) | PRIMARY CONTROLLER (813) | STANDBY CONTROLLER (823) |
| --- | --- | --- |
| 1 (840) | CONTROLLER 1 (841) | CONTROLLER 2 (842) |
| 2 | CONTROLLER 2 (843) | CONTROLLER 3 |
| 3 | CONTROLLER 3 | CONTROLLER 1 |
| 4 | CONTROLLER 2 | CONTROLLER 1 |
| 5 (844) | CONTROLLER 1 (845) | CONTROLLER 3 (846) |
| 6 | CONTROLLER 1 | CONTROLLER 2 |
| 7 | CONTROLLER 3 | CONTROLLER 1 |

FIG. 8D

| INDEX | PRIMARY CONTROLLER | FIRST STANDBY CONTROLLER | SECOND STANDBY CONTROLLER |
|---|---|---|---|
| 1 | CONTROLLER 1 (855) | CONTROLLER 2 (856) | CONTROLLER 3 (857) |
| 2 | CONTROLLER 2 | CONTROLLER 3 | CONTROLLER 1 |
| 3 | CONTROLLER 3 | CONTROLLER 1 | CONTROLLER 2 |
| 4 | CONTROLLER 2 | CONTROLLER 1 | CONTROLLER 3 |
| 5 | CONTROLLER 1 | CONTROLLER 3 | CONTROLLER 2 |
| 6 | CONTROLLER 1 | CONTROLLER 2 | CONTROLLER 3 |
| 7 | CONTROLLER 3 | CONTROLLER 1 | CONTROLLER 2 |

*FIG. 8F*

METHOD AND SYSTEM FOR HANDLING FAILURE IN A COORDINATED MULTICAST STREAMING SYSTEM

FIELD

Embodiments of the present disclosure relate to improving the scalability and redundancy of a wireless communications network. One embodiment of the present disclosure further relates to a method for handling multicast transmission when failure of a network device occurs.

GENERAL BACKGROUND

In recent years. Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with access points in order to obtain access to one or more network resources. An access point, referred to as an "AP," is a digital device that operates as a gateway for a client device to establish a connection (e.g., a communicative coupling) with one or more networks (e.g., the Internet, an intranet, etc.). For example, an AP may be implemented as a wireless AP (WAP), which is configured to communicate wirelessly with one or more client devices as well as communicate with a networked device associated with the one or more networks, such as a controller for example, through a wired connection.

With respect to enterprise networks and other types of expansive multiple controller-based networks, conventional WLAN architectures do not manage controllers' resources efficiently. For instance, a client device that is communicatively coupled to a first AP may switch to a second AP due to a change in location of the client device, failure of the first AP, a better signal strength for the second AP, or for a number of other reasons. The second AP then determines whether to grant the client device access to one or more network resources.

When a client device switches from a first AP to a second AP, the first AP and second AP may be managed by separate controllers. Currently, the controllers do not forward data (e.g., state information) of transferred client devices. So, if by switching controllers, the client device crosses an Open Systems Interconnection (OSI) Layer-3 (L3) boundary, therefore switching IP subnets, a communication tunnel (e.g., a Generic Routing Encapsulation "GRE" tunnel) may be created between the first controller and the second controller. In this situation, the network traffic of the client device that is received via the second AP may be routed to both the second controller and to the first controller via the GRE tunnel. One advantage of this situation is that all of the state information and client sessions for the client device are maintained. However, the network traffic takes a longer path because it is routed through two controllers and two controllers are serving the client device therefore wasting network resources. Furthermore, a network-wide table is required to implement the tunneling system as each original controller must be maintained for each client device. This creates scalability issues as the number of client devices and controllers increases.

In a second situation, a client device may switch from a first AP to a second AP where the APs are managed by separate controllers but the controllers are in the same IP subnet (i.e., the client device does not cross a L3 boundary). In this situation, there is no mechanism to indicate to the controllers that a communication tunnel should be created between the first controller and the second controller. The second controller now manages the client device but the second controller does not have any of the state information of the client device. Therefore, the client sessions of the client device must be discarded, the client device must be re-authentication and the client sessions and state information must be recreated. This creates a disruption in the connection for the client device and wastes resources of the network because the state information of the client device previously existed.

Additionally, conventional multiple controller-based WLAN architectures support "client matching," namely seamless matching of client devices with corresponding APs that are better able to provide network connectivity or communications as a whole with those client devices. For instance, according to conventional client matching techniques, a controller may attempt to direct a client device to a targeted AP within a first set of APs through a blacklisting function in which all APs controlled by the controller, except for the targeted AP, are precluded from associating with the client device. This may require the client device to disconnect from its current AP (e.g., transmit a De-authentication message in response to a prolonged connectivity disruption) and begin to seek to associate with another AP. When the controller performing the blacklisting function manages all of the APs this strategy is effective. However, if a second set of APs managed by a second controller is adjacent to the first set managed by the first controller, the client device may associate with an AP of the second set and disrupt the targeting process of the first controller. The first controller does not communicate with the second controller and therefore cannot notify the second controller of its intention to direct the client device to a particular AP.

In addition, it is desired that a second controller can seamlessly take over responsibilities of a first controller that has been placed in an inactive state (e.g., due to failure or manually by a network administrator). Current approaches fail to utilize communication among two or more controllers to maintain state information for a client device and/or an AP such that the second controller may take over the responsibilities of the first controller (e.g., controlling multicast transmissions to client devices via one or more APs).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present disclosure may be best understood by referring to the following description and accompanying drawings that are used to illustrate embodiments of the present disclosure.

FIG. 3A is an exemplary diagram of a table illustrating an initial state of an AP-to-controller (bucket map) configuration table prior to beginning the process of reassigning a client.

FIG. 3B illustrates the AP-to-controller (bucket map) configuration table of FIG. 3A with an updated column representing the standby controllers.

FIG. 3D illustrates the AP-to-controller (bucket map) configuration table of FIG. 3A with a fourth column representing the second standby controllers.

FIG. 6A illustrates an exemplary controller (bucket map) configuration table pertaining to a cluster of controllers wherein each controller is represented an equal number of times within the controller (bucket map) configuration table.

FIG. 6B illustrates an exemplary controller (bucket map) configuration table pertaining to a cluster of controllers wherein each controller is not represented an equal number of times within the controller (bucket map) configuration table.

FIG. 8A is an exemplary diagram of a table illustrating an initial state of a client device-to-controller (bucket map) configuration table prior to beginning the process of reassigning a client device.

FIG. 8B illustrates the client device-to-controller (bucket map) configuration table of FIG. 8A with an updated column representing the standby controllers.

FIG. 8C illustrates the client device-to-controller (bucket map) configuration table of FIG. 8B with an updated column representing the primary controllers.

FIG. 8D is a second exemplary diagram of a table illustrating an initial state of a client device-to-controller (bucket map) configuration table prior to beginning the process of reassigning a client device.

FIG. 8F illustrates the client device-to-controller (bucket map) configuration table of FIG. 8D with a fourth column representing the second standby controllers.

DETAILED DESCRIPTION

Figure 1:
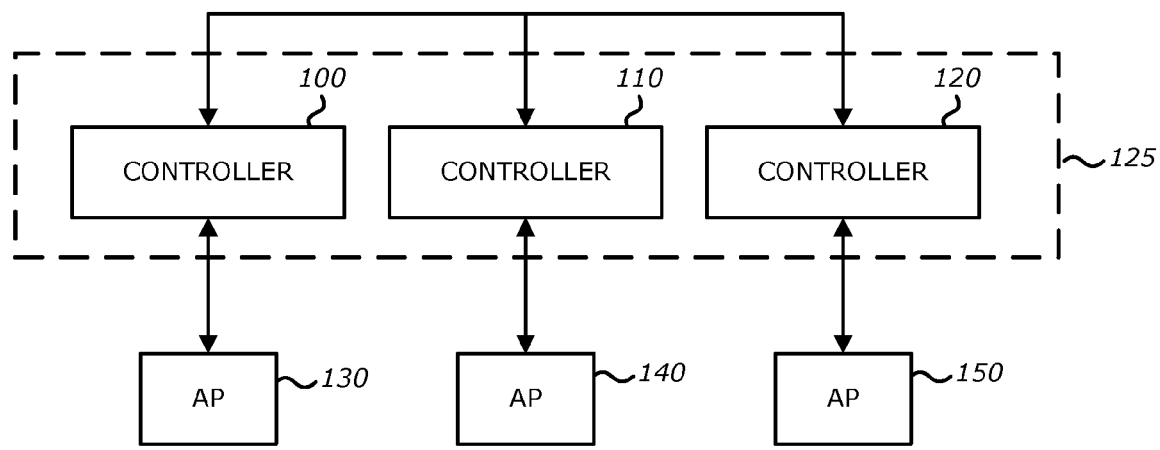
FIG. 1 illustrates a block diagram of an exemplary network system.

Various embodiments of the disclosure relate to the configuration of access points (APs) and controllers within a Wireless Local Area Network (WLAN). Multiple APs may be managed by a single controller on the network. A client device may associate with a first AP in order to connect to the network and roam from AP to AP expecting to maintain connectivity. According to one embodiment of the disclosure, when a client device initially joins a network, it is managed by a single controller. As the client device roams from AP to AP throughout the network, the controller maintains management of the client device. If the client device needs to be managed by a different controller, the information stored on the first controller is transitioned to the second controller.

In current architecture, a controller that handles a client device does not communicate state information regarding the client device to a second controller when the client device transitions from the first controller to the second controller. State information may include authentication information, firewall session information, multicast information, gateway information, and/or optimization information for a particular client device.

By providing an architecture and mechanism for controllers within a WLAN to communicate, the scalability, performance, reliability and redundancy of the wireless network is improved dramatically. Embodiments herein relate to one or more of the following: (1) client device steering to a controller; (2) AP steering to a controller; (3) client device synchronization and redundancy across controllers; or (4) enhanced multicast proxy among controllers.

A cluster of controllers may comprise a network entity serving one or more wireless clients. All of the controllers within a cluster include the same functionalities and capabilities so that any individual controller may serve any individual AP and any individual client device. This allows for the balancing of the workload among all of the controllers in any preferred distribution scheme. For example, in one embodiment, the workload may be balanced as evenly as possible among the controllers. Furthermore, more client devices may be served when multiple controllers communicate than when a single controller handles all APs and all client devices on a network.

The number of controllers within a cluster is not static. The number of controllers may increase or decrease for numerous reasons. Examples of such reasons may include, but are not limited or restricted to, the addition of a new controller to the system, the failure or the purposeful deactivation of a controller (e.g., to perform a software upgrade on the controller).

In addition, when one controller handles all APs and all client devices on a network, there is a large fault domain. When a controller that handles all or a large percentage of the APs or clients on the network fails or is unavailable, the impact is highly detrimental to the network. By distributing the workload of one or more APs or one or more client devices across a cluster of controllers having the same functionalities and capabilities, there is less of an impact when a controller fails or is unavailable to handle APs or client devices.

In one embodiment, when all controllers within a cluster include the same functionalities and capabilities, an "all active redundancy" scheme may be implemented.

I. Terminology

Herein, certain terminology is used to describe features within embodiments of the invention. For example, the term "network device" generally refers to electronic equipment which may be configured with an antenna system that enables transmission and/or receipt of wireless messages over a wireless network. Hence, the network device is further adapted with circuitry to support wireless connectivity with other network devices being part of the wireless network. Different types of network devices may include, but are not limited to (1) a client device and (2) an edge device.

Herein, the term "client device" may refer to a stationary network device (e.g., desktop computer, television, set-top box, video gaming console, etc.) or a mobile network device capable of connecting to one or more wireless networks. Illustrative examples of mobile network devices may include, among others, a tablet, laptop, netbook, bar-code scanner, a digital camera, and/or a mobile handset such as a smartphone or a personal digital assistant "PDA." Likewise, the term "access point" or "AP" is a network device, a type of edge device in particular, that controls access to a network, where the AP may be deployed as a wired access point that featured wired connectivity with one or more client devices or as a wireless access point that featured wireless connectivity with one or more client devices. Of course, the AP also may represent other types of edge devices such as a wireless base station, a cellular base station, or any device configured as a hot spot or gateway for network connectivity.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

The term "cluster of controllers" refers to one or more controllers comprising a network entity serving one or more wireless clients. When a cluster of controllers comprises a plurality of controllers, the controllers are able to communicate data among all controllers within the cluster of controllers. The controllers comprising a cluster of controllers may include controllers of multiple capacities.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "link" is a physical or logical communication path between two or more network devices. Examples of a link may include a wireless link that supports the transfer of wireless messages over certain radio frequency (RF) channels and/or bands or cellular frequency channels and/or bands, as well as the logic associated therewith.

The term "message" generally refers to information transmitted as information in a prescribed format, where each message may be in the form of a packet, a frame, an IEEE 802.11 frame, or any other series of bits having the prescribed format.

The term "control scope" refers to the network serviced by a cluster of controllers. For instance, the control scope of a cluster of controllers may comprise all access points (APs) and client devices serviced by the cluster of controllers.

The term "load balancing" includes, among other things, reassigning one or more client devices to one or more controllers based on the number of client devices assigned to a particular controller, the amount of network traffic being managed by a particular controller, the type of network traffic being managed by a particular controller, or the increase or decrease of the number of controllers within the cluster of controllers. Furthermore, load balancing may refer to the reassignment of one or more APs to one or more controllers based on the number of APs assigned to a particular controller, the amount of network traffic being managed by a particular controller or AP, the type of network traffic being managed by a particular controller or AP, or the increase or decrease of the number of controllers within the cluster of controllers or the number of APs within the control scope of the cluster of controllers.

The phrase "an assigned client device" refers to a client device that has joined a network and has state information stored on a single controller. The controller that is storing the state information is the "primary controller" of the client device. The network traffic coming from the assigned client device is transmitted only to the primary controller, not other controllers within the cluster of controllers, from the AP with which the client device is associated. The assigned client device remains assigned to the primary controller until the primary controller goes offline or if load balancing requires the AP to be assigned with a different controller.

The phrase "an assigned access point (AP)" refers to an AP that is managed by a single controller within the cluster of controllers. The controller that manages the assigned AP is the "primary controller" of the AP. The assigned AP remains assigned to the primary controller until an error occurs with the primary controller. Examples of possible errors with a controller include, but are not limited or restricted to, a failure of the controller, the controller being taken offline or possibly when load balancing is performed.

The term "an associated client device" refers to a client device that has joined the network and requested to transmit its network traffic through the AP. An associated client device does not necessarily stay associated with the particular AP for the life of its time connected to the network. Instead, a client device may roam throughout the network and associate with various APs.

The term "table" refers to an arrangement of data according to a selected organization. Examples of a "table" may include, but are not limited or restricted to, a collection of one or more rows and columns, a bucket map, a linked list, a hash table or any other data structure that maintains correspondence of data. A table may store a plurality of data.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Access Point (AP) Steering to a Controller

Access point (AP) steering to a controller consists of the act of assigning an AP to a controller within a cluster of controllers. The controller to which the AP is assigned is the AP's primary controller. The primary controller of an AP is responsible for handling the management of the assigned AP and pushing controller (bucket map) configurations to the AP. The "controller configuration" may be represented by, for example, a table, a linked list or other data structures that maintain correspondence of information. A controller (bucket map) configuration table allows the AP to know how to map a client device attempting to associate with the AP to the appropriate controller. The particulars associated with the controller (bucket map) configuration tables and the primary controller will be discussed later. Furthermore, the primary controller of an AP also coordinates multicast traffic delivery, which will also be discussed later.

When an AP is initially being configured to handle network traffic from client devices, the AP may be assigned to a controller within the cluster of controllers. The determination or identification of the assignment of the AP may be made based on, among other things, a radio frequency (RF) neighborhood, AP type or AP link characteristics, the physical location of one or more APs, the type of security offered (e.g., Wired Equivalent Privacy "WEP," Data Encryption Standard "DES," Advanced Encryption Standard "AES." Internet Protocol Security "IPSec," etc.), a hash value obtained through a hash function of an identifier of an AP (e.g., a media access control (MAC) address), the detection of a security threat associated with one or more APs, or the detection of a load on one or more APs being above or below a particular threshold. Another reason for steering one or more APs to one or more particular controllers may be based on the time of day or day of the week. For instance, it may be beneficial to reduce the power consumption of the network by powering down particular controllers or APs at a certain time of the day (e.g., 9 pm-6 am) or on one or more days of the week (e.g., Saturday and Sunday).

In one embodiment, the controller initially contacted by the AP attempting to be configured may handle, at least in part, the determination as to which controller of the cluster of controllers is assigned to the AP. In other embodiments, a managing controller of the cluster of controllers may be responsible for AP assignments, or in the alternative or in addition to the managing controller, the AP or a Software-Defined Networks (SDN) application may make the determination for AP assignment.

Referring to FIG. 1, a block diagram of an exemplary network system is illustrated. Controllers 100, 110 and 120 comprise a cluster of controllers 125 within a single network. AP 130 is assigned to controller 100, AP 140 is assigned to controller 110 and AP 150 is assigned to controller 120.

According to this embodiment of the disclosure, each AP 130, 140 and 150 is a stationary device within the network and therefore remains assigned to a single primary controller until (i) the primary controller fails, (ii) the primary controller is taken offline or (iii) load balancing requires the AP to be assigned with a different controller. However, when the primary controller goes offline or load balancing requires the AP to be assigned to a different controller, it becomes necessary to reassign the AP to a different controller. Furthermore, it may be beneficial to steer one or more APs to one or more particular controllers based on the characteristics or events discussed above regarding the initial steering of an AP to a controller.

An AP-to-controller (bucket map) configuration table is stored on each AP within the control scope of the cluster of controllers and on each controller within the cluster. The AP-to-controller configuration table maintains the correspondence of each AP and controller to which the AP is assigned. Therefore, when a controller becomes unavailable to manage one or more APs, the AP-to-controller configuration table storing the AP-to-controller assignments will be updated by the cluster of controllers in the same manner as will be discussed below regarding a client device-to-controller configuration table storing the client device-to-controller assignments.

The reassignment of an AP from one controller to a second controller within the cluster of controllers may occur for multiple reasons including, but not limited or restricted to, AP type, one or more attributes of the AP (e.g., a level of security the AP may offer, priority level of the AP, typical data being transmitted to/from the client devices associated with the AP, or location of the AP), heuristics or guidance from a managing controller, controller failure, purposefully removing a controller from the network (e.g., for a software upgrade) or balancing the workload on the network. In one instance, the clusters may determine that load balancing is necessary due to the number of hash collisions occurring within the current AP-to-controller configuration table.

Determining to which controller to steer an AP for reassignment may be made by multiple sources. For instance, the primary controller of the AP that needs to be reassigned may make the determination as to which controller should become the primary controller of the AP. In a second embodiment, a managing controller of the cluster of controllers may make the determination as to which controller should become the primary controller of the AP. In yet another embodiment, a Software-Defined Networks (SDN) application may make the determination as to which controller should become the primary controller of the AP.

Figure 2:
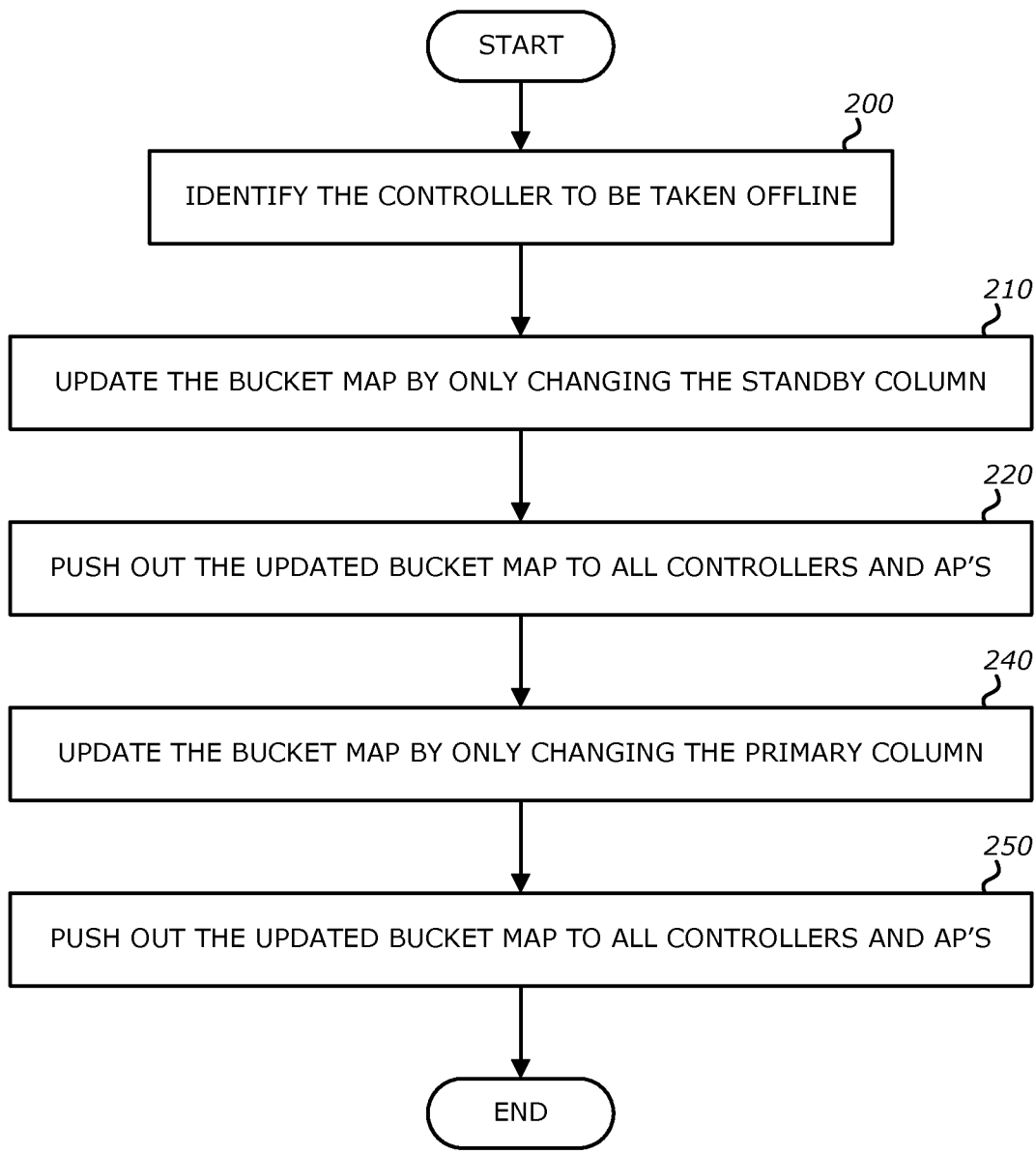
FIG. 2 is an exemplary diagram of a flowchart that illustrates a process of reassigning an access from a first primary controller to a second primary controller when redundancy is implemented.
Figure 3C:
FIG. 3C illustrates the AP-to-controller (bucket map) configuration table of FIG. 3B with an updated column representing the primary controllers.

Referring to FIG. 2, an exemplary diagram of a flowchart illustrating a process of reassigning a client device from a first primary controller to a second primary controller when redundancy is incorporated is provided. To further assist in the explanation of the process. FIGS. 3A-3C are provided. In the embodiment discussed with FIG. 2 and FIGS. 3A-3C, three controllers comprise the cluster of controllers: controller_1, controller_2 and controller_3.

Referring to FIG. 3A, an exemplary diagram illustrating an initial state of an AP-to-controller configuration table prior to beginning the process of reassigning an AP is provided. Column 300 represents the index value computed from the hash value computed from the MAC address of an AP (herein after "corresponding index value") that denotes the entry within the AP-to-controller configuration table in which the AP is to access. Column 310 represents the primary controller of the corresponding index value. Column 320 represents the standby controller of the corresponding index value. A standby controller of a corresponding index value is not currently managing any AP mapped to that index value. The standby controller of a first corresponding index value is the primary controller for one or more APs of a second index value.

Referring to FIG. 2, in block 200, the controller to be taken offline is identified. In this exemplary embodiment, controller_1 is to be taken offline so a software upgrade may be performed. In block 210, the AP-to-controller configuration table is updated by only changing the standby column. The updated AP-to-controller configuration table may then be distributed to all of the APs within the control scope of the cluster of controllers and to all of the controllers within the cluster (block 220). For example, as seen in FIG. 3B, the AP-to-controller configuration table of FIG. 3A includes an updated standby column representing the standby controllers (col. 321). It is seen in the column 321 that controller_1 has been removed from being a standby controller. For example, as seen in FIG. 3B, the content of the entry 350 has been updated from controller_1 to controller_2.

In block 230, the AP-to-controller configuration table is updated a second time but by only changing the primary column. The updated AP-to-controller configuration table may then be distributed to all of the APs within the control scope of the cluster and to all of the controllers within the cluster (block 240). For example, as seen in FIG. 3C, the AP-to-controller configuration table of FIG. 3B includes an updated column representing the primary controllers (col. 322). It is seen in col. 322 that controller_1 has been removed from being a primary controller. Therefore, controller_1 is no longer carrying any network traffic and may be taken offline for, among other reasons, a software upgrade process.

In other embodiments, there may be additional columns representing multiple standby controllers. Referring to FIG. 3D, the AP-to-controller configuration table of FIG. 3A is seen with a fourth column representing second standby controllers (col. 333). Column 333 provides a secondary backup controller in case both the primary controller (col. 313) and the first standby controller (column 323) fail for a particular corresponding index value. For example, if the primary controller of corresponding index value 1, controller_1 (entry 347), and the first standby controller of corresponding index value 1, controller_2 (entry 348) were to fail, controller_3, the second back up controller of corresponding index value 1 (entry 349), would manage the APs of corresponding index value 1.

The AP-to-controller configuration table may vary in size depending on, among other things, the number of controllers within the cluster and/or the number of APs within the control scope of the cluster.

III. Client Device Steering to a Controller

Client device steering to a controller consists of the act of assigning a client device to a controller within a cluster of controllers. When a client device initially joins a network, it may be assigned to a particular controller. The controller to which a client device is assigned is generally referred to as the client device's primary controller. A primary controller of a client device is responsible for handling all wireless network traffic from/to the client device. The primary controller of a client device also stores state information for that client device.

Previously, when a client device would roam to an AP assigned to a controller other than the primary controller, nothing would be done with the accumulated state information stored within the primary controller because the individual controllers did not communicate regarding controller relationships with client devices. Therefore, the primary controller of the AP to which the client device roamed was required to begin developing the state information of the client device on its own.

In contrast, one embodiment of the disclosure is directed to a network control scheme that enables a controller within a cluster to remain the primary controller for a client device as the client device roams from AP to AP, without regard to which IP subnet each AP resides or which controller each AP is assigned as long as each AP is within the control scope of the cluster. As a client device roams, the state information of the client device is retained by its primary controller. Since the primary controller does not change as the client device roams, the state information of the client device does need not to be recreated when the client roams to an AP that is not assigned to the client device's primary controller. Instead, the AP will query the primary controller for the state information and direct all network traffic to/from the client device to/from the primary controller.

Figure 4A:
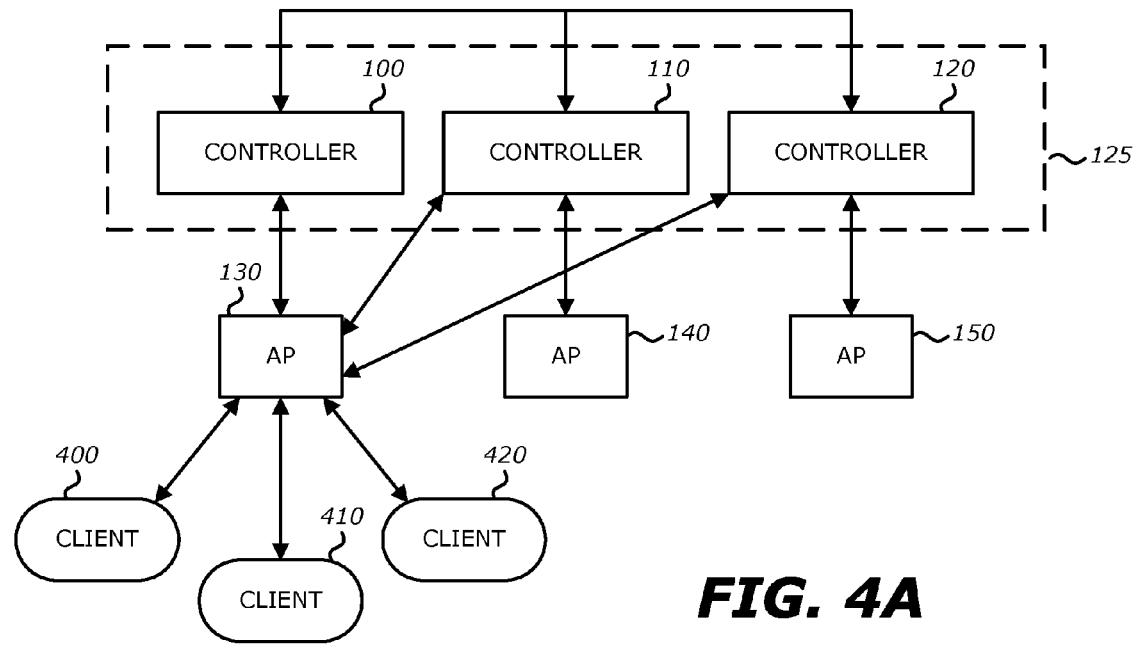
FIG. 4A illustrates a block diagram of an exemplary network system.

Referring to FIG. 4A, a block diagram of an exemplary network system is illustrated. Controllers 100, 110 and 120 comprise a cluster of controllers 125 within a single network. The AP 130 is assigned to the controller 100, the AP 140 is assigned to the controller 110 and the AP 150 is assigned to the controller 120. The client device 400 is assigned to the controller 100, the client device 410 is assigned to the controller 110 and the client device 420 is assigned to the controller 120. The client devices 400, 410 and 420 are all currently associated with the AP 130. With the client device 400 being assigned to the controller 100, the controller 100 stores the state information of and manages the network traffic of the client device 400. Similarly, the controller 110 stores the state information of and manages the network traffic of the client device 210 and the controller 120 stores the state information of and manages the network traffic of the client device 420.

Figure 4B:
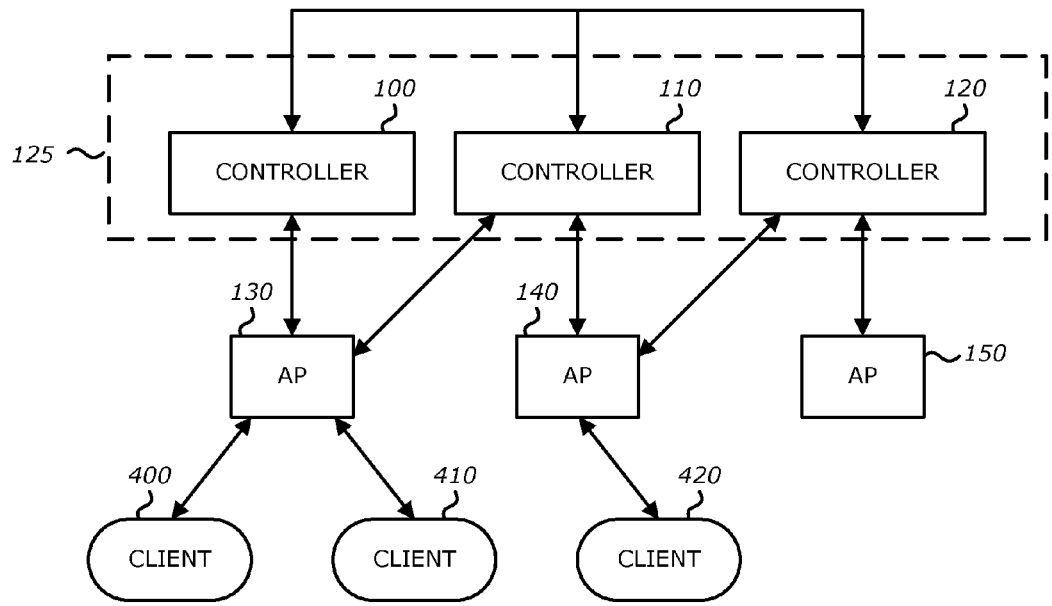
FIG. 4B illustrates a block diagram of the exemplary network system of FIG. 4A.

Referring to FIG. 4B, a block diagram of the exemplary network system of FIG. 4A where one client device has roamed is illustrated. Herein, it is seen that the client device 420 is now associated with the AP 140. This may be, for example, a result of the client device 420 roaming. However, even though the client device 420 is now associated with the AP 140, the client device 420 will remain assigned to the controller 120 because the AP 140 is within the control scope of the cluster. In this case, the AP 140 obtains state information of the client device 420 from a data path that does not include the primary controller of the AP 140 (i.e., the controller 110).

Therefore, FIG. 4A illustrates one embodiment in which a client device roams from a first AP managed by a first controller to a second AP within the control scope of the cluster managed by a second controller but the primary controller does not change. In this situation, the second AP determines or identifies which controller is the primary controller of the client device and obtains state and managing information of the client device from the primary controller. This prevents the need to recreate any state information by a controller within the cluster when a client device roams.

In one embodiment, when a client device initially attempts to associate with an AP, the network does not attempt to actively steer the client. Instead, each AP implements a hash function to determine whether the client device has already been assigned to a controller or if the client device is new to the system.

Figure 5:
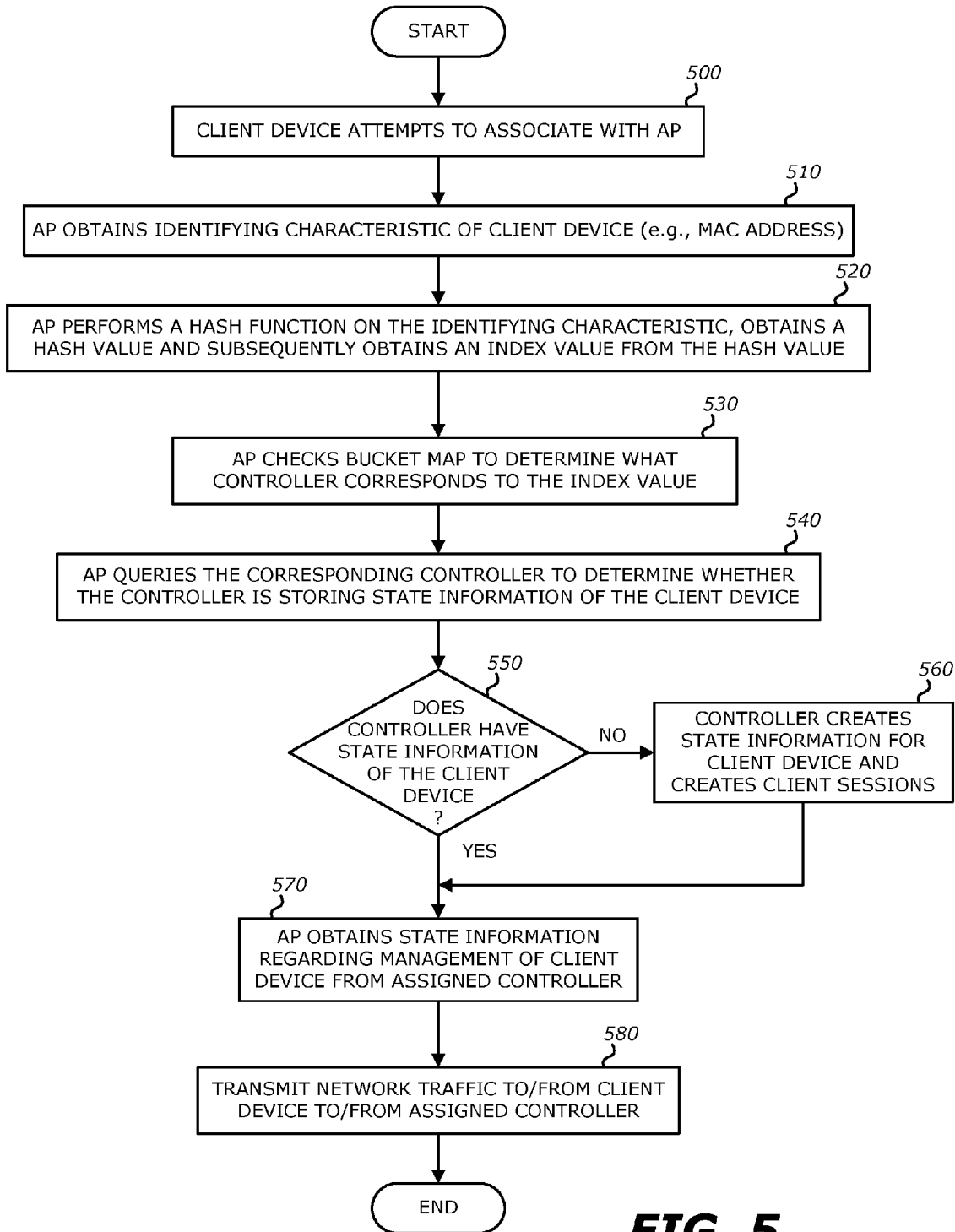
FIG. 5 illustrates an exemplary diagram of a flowchart wherein a client device attempting to associate with an AP.

Referring to FIG. 5, an exemplary diagram of a flowchart illustrating a client device attempting to associate with an AP is provided. In block 500, a client device attempts to associate with an AP. In block 510, the AP obtains an identifier of the client device (e.g., a MAC address).

In block 520, the AP performs a hash function on the MAC address of the client device and obtains a hash value and subsequently obtains an index value from the hash value. In block 530, the AP references a controller (bucket map) configuration table to determine which controller within the cluster of controllers corresponds to the index value. Once the AP has determined which controller corresponds to the index value, the AP queries the corresponding controller to determine whether the controller is storing state information of the client device (block 540). In block 550, the controller queried by the AP determines whether it is storing state information of the client device. If the controller is not storing state information of the client device (NO at block 550), then it is determined that the client device is new to the network so the controller creates the state information and starts the client sessions, such as on control protocol/internet protocol (TCP/IP) sessions, secure shell (SSH) sessions, etc. (block 560).

The hash function, which is the same for each AP, computes a hash value based on the MAC address of a client device. The AP maps the hash function to an index value in a client device-to-controller configuration table (e.g., a hash table). The client device-to-controller configuration table is stored on each AP and each controller. Each time an AP generates the hash value of a client device's MAC address, the hash value maps to the same index value in the client device-to-controller configuration table. Each index value corresponds to the controller managing the network traffic for all client devices whose MAC address maps to that index value. Therefore, when the client device attempts to associate with an AP (e.g., as a result of roaming), the hash value generated by the AP will always correspond to the same index value in the client device-to-controller configuration table and therefore to the controller managing the network traffic of the client device. As a controller managing a client device (the primary controller of that device), the primary controller manages the network traffic being sent from and received by the client device and also manages the state information of the client device. Furthermore, if the controller to which the index value corresponds does not contain any state information of the client device, the client device had never previously attempted to join the network.

Still referring to FIG. 5, once the controller corresponding to the index value creates the sessions and state information of the client device (block 560), the AP obtains the state information of the client device (block 570). Also, when the controller corresponding to the hash value is storing state information of the client (YES at block 550), the AP obtains the state information of the client device (block 570). Once the AP has obtained the state information of the client device, the AP transmits any network traffic to/from the client device to/from the primary controller (controller corresponding to the index value) (block 580).

The client device-to-controller configuration table may vary in size. In one embodiment, the client device-to-controller configuration table may consist of 128 entries and in a second embodiment, the client device-to-controller configuration table may consist of 256 entries.

In one embodiment, the client device-to-controller configuration table may be configured so that an equal number of index values within the client device-to-controller configuration table correspond to each controller within the cluster. Referring to FIG. 6A, an illustration of an exemplary controller (bucket map) configuration table pertaining to a cluster of controllers wherein each controller is represented an equal number of times is provided. In this embodiment, four controllers comprise the cluster: controller_1, controller_2, controller_3 and controller_4. Column 600 represents the index value that denotes the entry within the client device-to-controller configuration table in which the AP is to access. Column 610 represents the controller corresponding to the computed index value. The content of one entry within column 610 repeats every fifth row. For example, the contents of col. 610, rows 001, 005 . . . 253 is controller_1 while the contents of col. 610, rows 002, 006 . . . 254 is controller_2. Each controller is represented 64 times (256/4) in the client device-to-controller configuration table so the probability that a client device will be assigned to any one controller is equal for each controller. In an embodiment where each controller is represented an equal number of times within the client device-to-controller configuration table, the workload is likely to be evenly distributed among the controllers. The MAC address of a client device attempting to join the network has an equal probability corresponding to each index value and therefore there is an equal probability of the client device being assigned to any single controller.

However, the client device-to-controller configuration table may be arranged so one or more controllers appear at a higher density than one or more controllers. This would alter the probability of a client device being assigned to a particular controller. For example, the client device-to-controller configuration table may be configured to purposefully increase the probability of client devices joining the network being assigned to a particular controller. This may be desirable if one controller contains a larger amount of memory and/or processing power than another controller. Referring to FIG. 6B, an illustration of an exemplary client device-to-controller configuration table pertaining to a cluster of controllers wherein each controller is not represented an equal number of times within the client device-to-controller configuration table is provided. As in the embodiment of FIG. 4A, four controllers comprise the cluster of controllers: controller_1, controller_2, controller_3 and controller_4. Column 620 represents the index value computed from the hash value computed from the MAC address of a client device (herein after "corresponding index value") that denotes the entry within the client device-to-controller configuration table in which the AP is to access. Column 630 represents the controller corresponding to the computed index value. The content of entries within column 630 have no repetitive pattern and no two controllers necessarily appear an equal number of times. For example, controller_1, which is seen to fill the entries of col. 630, row 001, 004, 006, etc., may appear more or less times than, for example, controller_3. By configuring the client device-to-controller configuration table to contain a higher density of a first controller, a client device joining the network is more likely to be assigned to the first controller than the other controllers. Therefore, it is possible to initially attempt to purposefully assign more client devices to one or more controllers than other controllers by controlling the configuration of the client device-to-controller configuration table.

The location of the appearance of a controller within the client device-to-controller configuration table (i.e., index value) has no relevance as to the controller's probability of being selected as a primary controller for a client device joining the network. Each index value has an equal probability of corresponding to the hash value generated by the AP. Therefore, all appearances of a single controller may be grouped together (e.g., the first 64 index values within a client device-to-controller configuration table of 256 index values) or located throughout the client device-to-controller configuration table (e.g., randomly allocated 64 index values within the client device-to-controller configuration table).

In addition, the more index values in the client device-to-controller configuration table, the higher the level of granularity of load balancing that can be achieved. For example, a client device-to-controller configuration table with 8 entries pertaining to a cluster of controllers comprising four controllers results in 4096 ways of configuring the client device-to-controller configuration table (i.e., $8^4$). In contrast, a client device-to-controller configuration table with 256 entries pertaining to the same cluster of controllers results in over four billion (4,294,967,296) ways of configuring the client device-to-controller configuration table (i.e., $256^4$). Therefore, the probability that any one controller is assigned as a new client device's primary controller may be controlled to a more precise percentage as the number of entries in the client device-to-controller configuration table grows.

Although the client device-to-controller configuration table may be configured so that the initial assignment of client devices to controllers within the cluster is likely to assign client devices in a desired manner, there is no guarantee that the desired result will occur. This is because the assignments are based on the hash values computed in an unpredictable manner by the hash function of the APs. Therefore, it may be advantageous, or necessary, to be able to reassign, or steer, one or more particular client devices to a different controller within the cluster of controllers.

The reassignment of a client device from one controller to a second controller within the cluster of controllers may occur for multiple reasons including, but not limited or restricted to, client device type (e.g., mobile telephone or laptop), one or more attributes of the client device (e.g., security clearance of the client device, priority level of the client device, typical data being transmitted to/from the client device, or location of the client device), heuristics or guidance from a managing controller, controller failure, purposefully removing a controller from the network (e.g., for a software upgrade) or balancing the workload on the network. In one instance, the clusters may determine that load balancing is necessary due to the number of hash collisions occurring within the current client device-to-controller configuration table. A high number of collisions may imply that one or more controllers are managing a high number of client devices. Load balancing may allow for a more even distribution of the client devices across the controllers of the cluster of controllers. Therefore, when a high number of collisions is detected, the workload on the cluster is rebalanced in order to attempt to avoid a large disparity in the workloads being managed by each controller.

Another example of a reason to steer one or more client devices includes security needs of particular controllers (e.g., required security clearance levels of a client device). For instance, it may be necessary to place client devices requiring a first level of security on a first controller and client devices requiring a second, higher level of security on a second controller. Alternatively, client devices may be steered to particular controllers based on the type of service required by the client device. Client devices of high importance may be placed on one or more secure, high performance controllers and client devices of less importance on other controllers. For example, a cluster of controllers may steer personal mobile phones to a first set of controllers and steer enterprise laptops to a second set of controllers that are more secure than the first set of controllers. Other possibilities for reasons for reassigning a client device include, among others, the physical location of the client, the type of data the client device is sending and/or receiving, where data from a client device is being transmitted, or performance of one or more client devices.

In some embodiments, the current Layer-2 domain of the controller may be considered when determining to which controller to reassign a client device. In one embodiment, the cluster will ensure the controller to which the client device is to be reassigned is on the same Layer-2 domain as the current primary controller of the client device. This prevents the new primary controller from having to de-authenticate and re-authenticate the client device.

In other embodiments, a cost model may be taken into consideration when determining to which controller to reassign a client device. A cost model may take into consideration multiple factors and determine a weighted number corresponding to assigning the client device to one or more controllers. Examples of factors that may be taken into consideration include, but are not limited or restricted to, the central processing unit (CPU) and available memory of each controller, the link cost and link distance between the AP associated with the client device and each controller, link performance and/or link delay.

Figure 7:
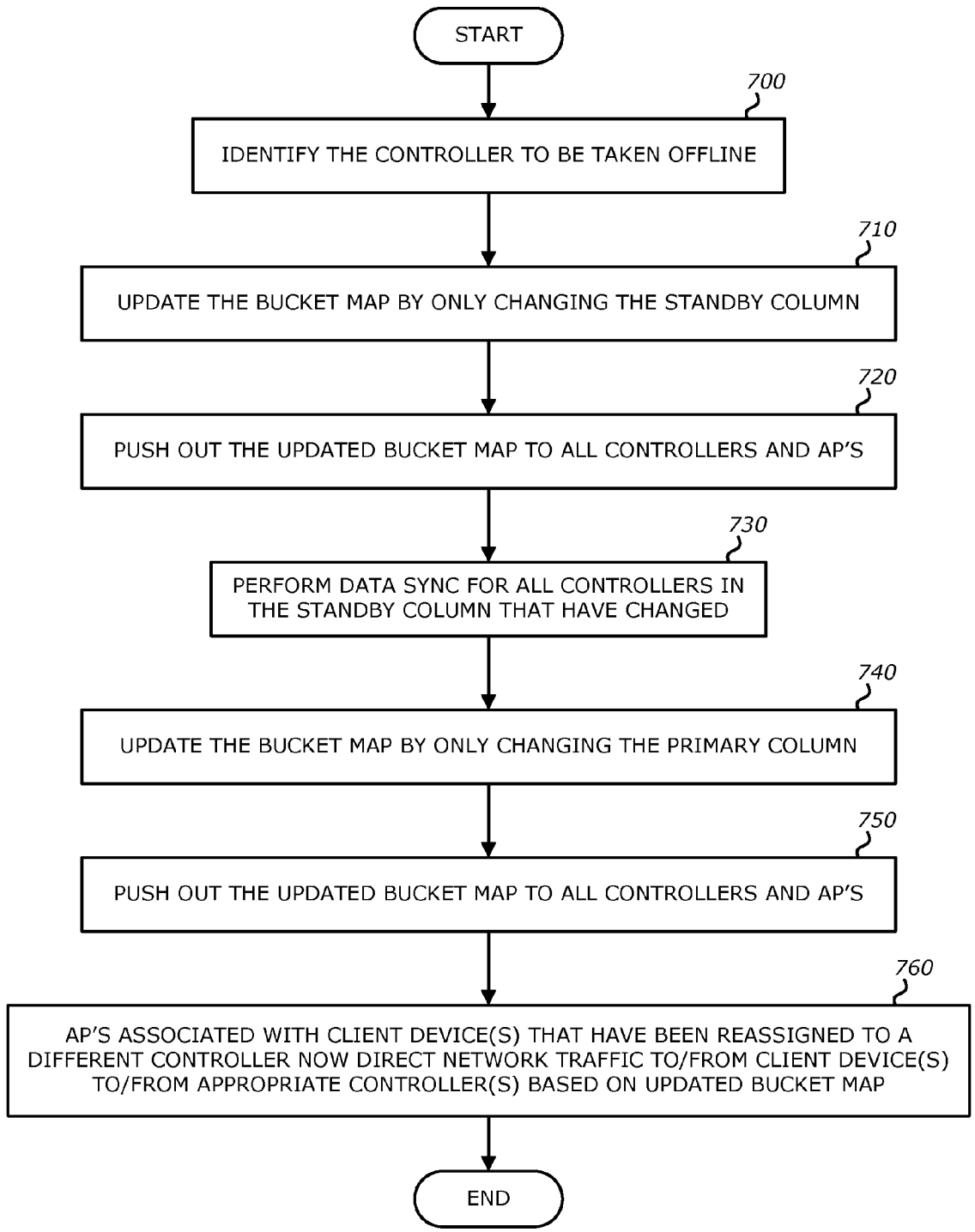
FIG. 7 is an exemplary diagram of a flowchart that illustrates a process of reassigning a client device from a first primary controller to a second primary controller when redundancy is implemented.

Referring to FIG. 7, an exemplary diagram of a flowchart illustrating a process of reassigning a client device from a first primary controller to a second primary controller when redundancy is incorporated is provided. To further assist in the explanation of the process, FIGS. 8A-8C are provided. In the embodiment discussed with FIG. 7 and FIGS. 8A-8C, three controllers comprise the cluster of controllers: controller_1, controller_2 and controller_3.

Referring to FIG. 8A, an exemplary diagram illustrating an initial state of a client device-to-controller configuration table prior to beginning the process of reassigning a client is provided. Column 800 represents the index value computed from the hash value computed from the MAC address of a client device (herein after "corresponding index value") that denotes the entry within the client device-to-controller configuration table in which the AP is to access. Column 810 represents the primary controller of the corresponding index value. Column 820, initially empty, represents the standby controller of the corresponding index value. A standby controller of a corresponding index value is not currently managing any client device mapped to that index value.

Referring to FIG. 7, in block 700, the controller to be taken offline is identified. In this exemplary embodiment, controller_1 is to be taken offline so a software upgrade may be performed. In block 710, the client device-to-controller configuration table is updated by only populating the rows of the standby column having controller_1 as the primary controller. The updated client device-to-controller configuration table is then distributed to all of the APs within the control scope of the cluster of controllers and to all of the controllers within the cluster (block 720). For example, as seen in FIG. 8B, the client device-to-controller configuration table of FIG. 8A includes an updated standby column representing the standby controllers (col. 821) for index values 1, 5 and 6.

In block 730, a data synchronization by each controller that has been updated in the standby column is performed. For example, as seen in FIG. 8B, the content of the entry 850 has been updated to contain controller_2. Therefore, during the data synchronization process, controller_2 will obtain a copy of the state information of any client devices of corresponding index value 1.

In block 740, the client device-to-controller configuration table is updated a second time but by only changing the primary column. The updated client device-to-controller configuration table is then distributed to all of the APs within the control scope of the cluster and to all of the controllers within the cluster (block 750). For example, as seen in FIG. 8C, the client device-to-controller configuration table of FIG. 8B includes an updated column representing the primary controllers (col. 812). It is seen in col. 812 that controller_1 has been removed from being a primary controller. Therefore, controller_1 is no longer carrying any network traffic and may be taken offline for, among other reasons, a software upgrade process.

Still referring to FIG. 7, in block 760, the APs associated with client device(s) that have been reassigned to a new controller now direct network traffic to/from client device(s) to/from the appropriate controller(s) based on the updated client device-to-controller configuration table as seen in FIG. 8C. For example, the APs associated with any client devices of corresponding index value 5 will now direct network traffic to/from those client devices to/from controller_2 instead of controller_1.

The above embodiment provides the benefit of allowing for a gradual upgrade in software among the controllers of the cluster. Controllers may be taken offline for a software upgrade (or for other reasons) in increments, thereby creating minimal disruption to the network. This reassignment process also allows for an incremental addition of the controllers to the cluster.

An associated AP must be aware of a controller failing or being taken offline in order to transmit data from a client device to the correct controller. An associated AP is notified by its primary controller that a controller has failed. Each controller within the cluster periodically transmits a signal (e.g., a heartbeat signal) to each controller in the cluster. When a controller fails or is taken offline, the other controllers recognize this as soon as a heartbeat is no longer received from the controller that failed or was taken offline. In one embodiment, the heartbeat signals may be as frequent as 10 times per second. The primary controller of each AP notifies the AP that the controller failed, and the AP knows to look to the standby column in the client device-to-controller configuration table for any index having to the controller that failed or was taken offline as the primary controller. Furthermore, when an updated client device-to-controller configuration table is distributed, an AP is notified by its primary controller. An AP assigned to the controller that failed is notified by the standby controller of the AP.

The various reasons for reassigning a client device from a first controller to a second controller can be grouped into two categories: nondeterministic events and deterministic events. Nondeterministic events are events whose time of occurrence is unknown in advance to the cluster and the APs within the control scope of the cluster of controllers. These include, among others, a controller failure. Deterministic events are events whose time of occurrence is known in advance to the system. These include, among others, load balancing, software upgrades to one or more controllers, or an increase or decrease in the number of controllers in the cluster.

With nondeterministic events, there is a possibility of losing state information of client devices connected to the network when redundancy is not implemented. In one embodiment with redundancy implemented, the standby controllers always maintain an up-to-date copy of the state information of the client devices for whom they act as the standby controller. In that embodiment, whenever state information of a client device is changed, the controller acting as the standby controller is notified and the copy of the state information of that client device is updated.

In other embodiments, in order to preserve the resources of the cluster of controllers, the cluster of controllers may not always maintain an up-to-date copy of the state information of each client device. Instead, the cluster of controllers may periodically resynchronize the state information of one or more client devices. For instance, the cluster may be configured to synchronize state information of each client device for whom it acts as the standby controller. The frequency of synchronization may be dynamically adjusted. In some embodiments, the frequency of resynchronize may be based on extended service set identification (ESSID) (i.e., network name) or the importance of each client device. Furthermore, the cluster of controllers may synchronize only certain portions of state information based on the particular type of network traffic being transmitted to/from the client device and/or the length particular sessions created by the client device. For example, a plurality of TCP/IP sessions may be created by a controller when a client device first opens a web browser application in order to load data of the website. These TCP/IP sessions typically have a short live span, for example, one or two seconds, so the cluster does not want to waste resources by synchronizing these sessions. Therefore, in some embodiments, the cluster of controllers may synchronize only some client device sessions within the state information of the client device based on the lifespan of the session.

When the client device-to-controller configuration table changes, it may not be necessary to de-authenticate and re-authenticate each client device with the new primary controller. The need for de-authentication and re-authentication may be based on whether network layer-connectivity of the old primary controller and the new primary controller. In one embodiment, all controllers of the cluster are placed on the same Layer-2 domain. In a second embodiment, controllers of the cluster may be placed on separate Layer-2 domains. In a third embodiment, one or more controllers of the cluster may be placed on a Layer-2 domain and one or more controllers of the cluster may be placed on a Layer-3 domain.

The communication between controllers within the cluster allows state information of each client device being reassigned to be transitioned to the new primary controller. As long as the old primary controller and the new primary controller are on the same Layer-2 domain, no de-authentication and re-authentication is necessary. In this case, the heartbeat from the AP to the client device is still present, so the client device may not even know that its primary controller has changed. However, if the old primary controller and the new primary controller are on separate Layer-2 domains, de-authentication and re-authentication processes are required because the IP address the client device previously used is no longer valid.

When the new primary controller and the old primary controller are different Layer-3 domains, the cluster will need to perform de-authentication and re-authentication processes when a client device is reassigned.

Determining to which controller to steer a client device may be made by multiple sources. For instance, the AP associated with a client device that needs to be reassigned may make the determination as to which controller should become the primary controller of the client device. In a second embodiment, the primary controller of the client device that needs to be reassigned may make the determination as to which controller should become the primary controller of the client device. In yet another embodiment, the primary controller of the client device to be reassigned and the AP associated with the client device to be reassigned may work together to make the determination as to which controller should become the primary controller of the client device.

In some embodiments, multiple client device-to-controller configuration table are managed by the cluster of controllers. For example, the cluster of controllers may manage multiple networks, each having a different ESSID. For example, a corporation may employ two separate networks, a first network for employees and a second network for guests. The employee network may, among other things, offer more services, provide a higher level of security, and/or extend to a larger physical area. In such an embodiment, an employee's client device connected to the employee network would be placed in a first client device-to-controller configuration table. An AP within the control scope of the cluster of controllers may determine which client device-to-controller configuration table to reference to determine a client device's primary controller based on the ESSID broadcasted by the client device.

Client devices may initially be assigned or reassigned without the use of a client device-to-controller configuration table in some embodiments. In the case of an initial assignment, the AP with which the client device associates may query each controller within the cluster to determine to which controller to assign the client device joining the network. Alternatively, the controller to which the AP is assigned may query the other controllers. A determination may be made based on, among other things, each controller's current work load, the number of client devices currently assigned to each controller, the physical location of the client device, or the security level required by the client device. In the case of a reassignment, the AP currently assigned to a controller that needs to have one or more of its client devices reassigned may query each controller to determine to which controller to reassign client devices whose MAC addresses correspond to a particular index value. In another embodiment, the controller that is attempting to have one or more of its client devices reassigned may query the other controllers.

IV. Client Device Synchronization and Redundancy Across Rollers

As discussed above, some embodiments of the invention may implement redundancy within the cluster of controllers. When redundancy is implemented within the cluster, the client device-to-controller configuration table stored on each controller within the cluster and each AP within the control scope of the cluster, contains at least a column representing an index value (computed from the hash value computed by an AP), a column representing the primary controller corresponding to the index value and a column representing the standby controller corresponding to the index value.

Referring to FIG. 8D, a second exemplary diagram of a table illustrating an initial state of a client device-to-controller configuration table prior to beginning the process of reassigning a client is provided. Column 803 represents the index value corresponding to the MAC address of a client device (herein after "corresponding index value"), column 813 represents the primary controller of the corresponding index value and column 823 represents the standby controller of the corresponding index value.

When a primary controller becomes unavailable to handle APs or client devices (e.g., it fails or is taken offline), an AP supporting a client device assigned to the unavailable controller will rely on support by the corresponding standby controller for instructions on how to manage the client device. The AP will begin directing network traffic from the client device to the standby controller. This allows for the client device to continue operating on the network with minimal disruption. When a primary controller becomes unavailable, the cluster will update the client device-to-controller configuration table and distribute the updated client device-to-controller configuration table to all of the APs within the control scope of the cluster and all of the controllers within the cluster.

In FIG. 8D, the primary controller for the client devices of corresponding index value 1 (entry 840) is controller_1 (entry 841). The standby controller for the client devices of corresponding index value 1 is controller_2 (entry 842). Therefore, controller_2 does not backup the state information for all of the client devices assigned to controller_1, but only backs up those client devices of corresponding index value 1 (entry 840). To explain further, the primary controller of corresponding index value 5 (entry 844) is also controller_1 (entry 845). The standby controller of corresponding index value 5 (entry 844) is controller_3 (entry 846). Therefore, with the primary controller the same for corresponding index values 1 and 5 (controller_1), comparing the standby controllers of corresponding index values 1 and 5, controller_2 and controller_3 respectively, it can be seen that the standby controllers back up state information of client devices on a per index value basis as two different controllers backup state information of different client devices currently assigned to one controller.

For example, in FIG. 8D, if controller_2 were to fail, the APs associated with client devices whose primary controller is controller_2 would be required to determine the index value to which each client device's MAC address corresponds (i.e., either index value 2 or index value 4). Each AP would then rely on support by the corresponding standby controller for each index value. For instance, if the MAC address of a client device assigned to controller_2 corresponds to index value 4, the associated AP will rely on the support by controller_1 if controller_2 fails. In contrast, if the MAC address of a client device assigned to controller_2 corresponds to index value 2, the associated AP will rely on support by controller_3 if controller_2 fails.

Figure 8E:
FIG. 8E illustrates the client device-to-controller (bucket map) configuration table of FIG. 8D with updated primary controller and standby columns.

Upon failure of a controller (e.g., controller_2), the cluster of controllers will update the client device-to-controller configuration table and distribute the updated client device-to-controller configuration table to all of the controllers within the cluster and all of the APs within the control scope of the cluster. Referring to FIG. 8E, the client device-to-controller configuration table of FIG. 8D is seen with updated primary controller and standby columns. As is seen in FIG. 8E, controller_2, because of its failure, no longer appears in either the primary controller column (col. 814) or the standby controller column (col. 824). Furthermore, the client device-to-controller configuration table of FIG. 8E is seen to have updated the primary controller column (col. 814) by replacing controller_2 with the corresponding standby controller (e.g., controller_3 for index value 2 and controller_1 for index value 4). The standby controller column (col. 824) was also updated with an active controller not assigned as the primary controller for that index value (e.g., controller_1 for index value 2 and controller_3 for index value 4).

In other embodiments, there may be additional columns representing multiple standby controllers. Referring to FIG. 8F, the client device-to-controller configuration table of FIG. 8D is seen with a fourth column representing second standby controllers (col. 835). Column 835 provides a secondary backup controller in case both the primary controller (col. 815) and the first standby controller (col. 825) fail for a particular corresponding index value. For example, if the primary controller of corresponding index value 1, controller_1 (entry 855), and the first standby controller of corresponding index value 1, controller_2 (entry 856) were to fail, controller_3, the second back up controller of corresponding index value 1 (entry 857), would manage the client devices of corresponding index value 1.

The standby configurations discussed above may be called an "all active" redundancy scheme. This is so because, as the "standby controller" backs up the state information of the client devices of the corresponding index value, it may also be actively managing other client devices. For example, referring again to FIG. 8D, the primary controller of corresponding index value 2 is controller_2 (entry 843). Controller_2 is also the standby controller corresponding to the key index 1. Therefore, as controller_2 backs up the state information of the client devices of corresponding index value 1, it also serves at the primary controller for the client devices of corresponding index value 2.

The "all active" redundancy scheme differs from a redundancy scheme that employs one controller as an primary controller and one controller that only serves to back up the primary controller without managing any client devices until the primary controller fails. An example of the latter redundancy scheme is redundant array of independent disks (RAID).

For example, in a RAID scheme, there may be 10 client devices being actively managed by controller_A which would require the state information of the 10 client devices to be backed up on controller_B. Therefore, if controller_A and controller_B fail, the state information for all 10 client devices would be lost. In contrast, if 10 client devices are being actively managed by a single controller within a cluster of controllers, the state information of the 10 client devices may be backed up by several other controllers within the cluster. Therefore, if two controllers fail, the state information for all 10 client devices will not be lost. Furthermore, when one controller is taken offline for any reason, the cluster updates the client device-to-controller configuration table stored on each controller and AP and resynchronizes the state information for any controllers that now serve as a backup controller for a different index value.

A second issue with a RAID scheme is that controller_B must be the same size as controller_A because controller_B backs up all of controller_A. However, the redundancy in a cluster of controllers does not require that all, or any, of the controllers be the same size. As discussed above in accordance with FIG. 8D, both controller_2 and controller_3 back up portions of controller_1. There is no requirement that controller_1, controller_2 and/or controller_3 are the same size.

V. Enhanced Multicast Proxy Among a Cluster of Controllers

Enhanced multicast proxy among a cluster of controllers is a mechanism for orchestrating the communication between the controllers within a cluster to increase the efficiency of transmitting multicast streams to client devices connected to the cluster of controllers. When multiple client devices are connected to a cluster of controllers and are subscribed to one or more of the same multicast groups, it is desirable to avoid transmitting multiple copies of each multicast stream over the network.

Figure 9A:
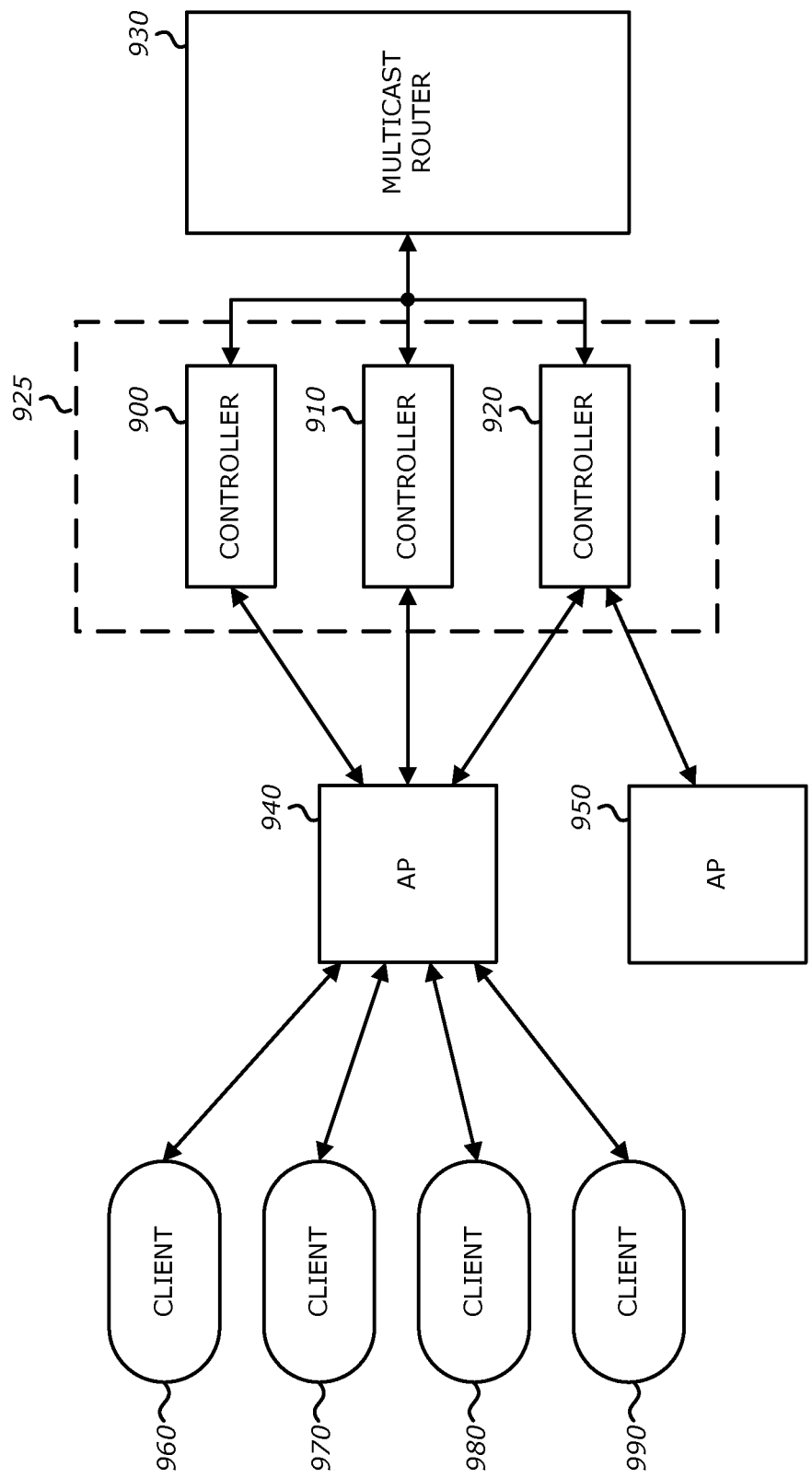
FIG. 9A illustrates a diagram of an exemplary network system including a multicast router.

Referring to FIG. 9A, a diagram of an exemplary network system including a multicast router is illustrated. A cluster of controllers 925 includes the controllers 900, 910 and 920. Each controller communicates with the multicast router 930. The controller 900 serves as the primary controller for the AP 940 and the client device 960. The controller 910 serves as the primary controller for the client device 970. The controller 920 serves as the primary controller for the AP 950 and the client devices 980 and 990. Each of the controllers 900, 910 and 920 subscribes to one or more multicast streams on behalf of their respective client devices. The multicast streams are then forwarded from each controller 900, 910 and 920 to the AP 940 with which the client devices 960, 970, 980 and 990 are associated.

One issue to consider is that a wireless network is typically not assigned one large grouping of consecutive IP addresses; therefore, a wireless network may consist of multiple virtual local area networks (VLANs). For example, a corporation with 1,000 employees may receive consecutive IP addresses to assign to client devices in groupings of 256 IP addresses. In this situation, one grouping comprises a single VLAN. Since there are 1,000 employees, at least four such VLANs will be required to accommodate the client devices on the network. If multiple client devices, each on a different VLAN, are all associated with the same AP and all of the client devices subscribed to the same multicast streams, there is potential for wasted resources on the network due to unnecessary copies of the multicast stream being distributed. Therefore, in one embodiment, each controller may be on a separate VLAN.

Figure 9B:
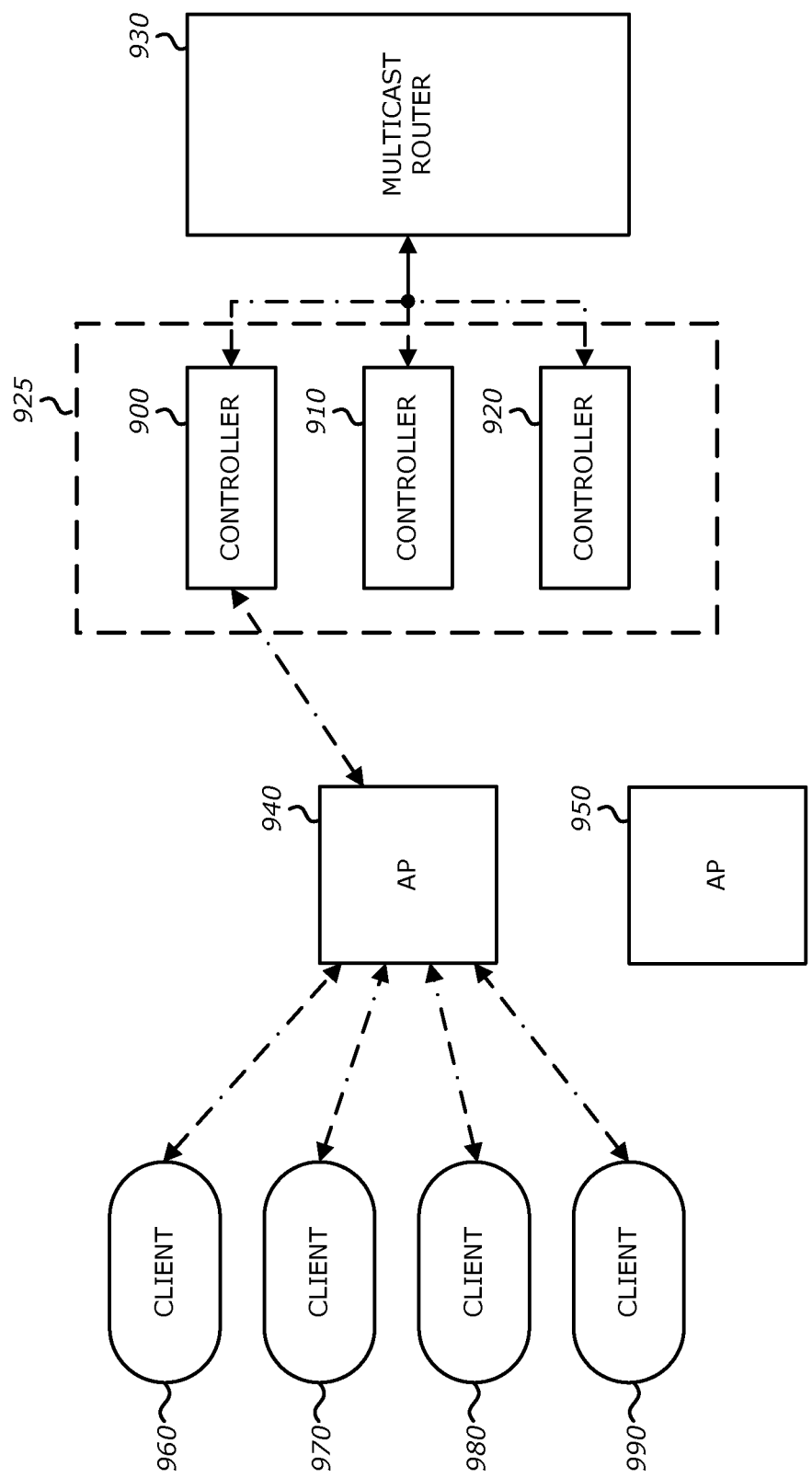
FIG. 9B is a diagram of the exemplary network system of FIG. 9A illustrating the multicast transmission paths.

Referring to FIG. 9B, a diagram of the exemplary network system of FIG. 9A illustrating the multicast transmission paths (e.g., a data stream path) is provided. It is seen that the AP 940 is only receiving multicast transmission from the controller 900. In order to avoid the transmission of unnecessary copies of a single multicast stream over the network, the cluster of controllers 925 utilizes the communication among the controllers. The cluster 925 allows the primary controller of the AP with which the client devices are associated (herein after "associated AP") to be the multicast subscriber for the client devices associated with the AP and distribute the multicast stream(s). Therefore, if multiple client devices associated with a single AP subscribe to the same multicast stream, the primary controller of the associated AP (i.e., the controller 900) will notify the multicast router of a subscription to the particular multicast stream only once (as opposed to each client device sending its own subscription notification, e.g., "Internet Group Management Protocol (IGMP) join"). Furthermore, only the primary controller of the associated AP needs to subscribe to the multicast stream. There, in one embodiment, when the primary controller of the associated AP acts as the multicast subscriber, only one copy of a multicast needs to be sent from the multicast router to the primary controller and the primary controller only needs to send one copy per SSID or BSS down to the client devices through the associated AP.

In the cluster organization, the primary controller acts as the multicast subscriber for client devices associated with the AP assigned to the primary controller regardless of whether the primary controller for the associated AP is the primary controller for one or more client devices associated with the AP. For example, referring to FIG. 9B, the controller 900 will subscribe to the multicast router 930 on behalf of the client devices associated with the AP 940. The controller 900 is not the primary controller for the client devices 970, 980 and 990 but because the client devices 970, 980 and 990 are associated with the AP 940 and the controller 900 is the primary controller for the AP 940, the controller 900 serves as the multicast subscriber on behalf of the client devices 970, 980 and 990 as well as the client device 960 for which the controller 900 serves as the primary controller.

In another embodiment, the cluster of controllers may determine a controller other than the primary controller of the associated AP is to transmit the multicast stream to the associated AP. The determination may be made based on, among other things, the number of copies of the multicast stream being received by an associated AP from a plurality of controllers. For example, if the number of copies received by the associated AP is above a given threshold, the cluster may determine a particular controller within the cluster that is best suited to transmit the multicast stream to the associated AP.

However, there may be issues with delivering every multicast stream via multicast. For example, if client devices go into a sleep mode as a result of a period of nonuse, the rate at which a multicast stream is transmitted may not be sufficient to wake up the device in order for the client device to receive the multicast stream (however, the rate at which unicast streams are transmitted is typically sufficient to wake up a client device). Alternatively, transmitting a multicast stream to a small number of client devices may be more costly to the network than converting the multicast stream into a unicast stream and transmitting an individual copy to each subscribing client device.

Therefore, in one embodiment, the primary controller for the AP associated with one or more client devices may deliver one or more multicast streams via unicast. This is accomplished using a dynamic multicast optimization (DMO) process. This means that the primary controller for the AP determines whether to send multicast streams via multicast or via unicast based on various factors. Examples of the various factors include, but are not limited or restricted to, the number of client devices associated with the AP, the number of streams to which the client devices are subscribed, network conditions (e.g., radiofrequency (RF) environment or channel quality), transmission rates of unicast and multicast to the client devices and/or the number of client devices subscribed to a particular multicast stream. The primary controller for the AP is aware of the multicast subscriptions of each client device that is associated with the AP and contains logic to decide whether one or more multicast streams should be sent via unicast instead of multicast.

For example, if a primary controller for an AP is managing the transmission of multicast streams for two or three client devices, the primary controller for the AP may decide to send the multicast streams via unicast but if the primary controller for the AP is managing a larger number of client devices, such as ten (10) client devices for example, the primary controller for the AP may decide to send the multicast streams via multicast.

In one embodiment, when a multicast stream is sent via multicast, the group key necessary to decrypt the stream is known by each client device on the same SSID. Furthermore, in this or another embodiment, when a multicast stream is sent via unicast, each client may be required to have a client device specific key in order to decrypt the stream.

When sending a multicast stream via unicast, the primary controller for the AP coordinates with the set of primary controllers of each client device associated with the AP to convert the multicast stream into unicast. Each primary controller of a client device associated with the AP transmits the unicast stream to its one or more client devices associated with the AP. This distributes the workload over the entire set of primary controllers of a client device associated with the AP, therefore, in such an embodiment, each primary controller of a client device must be subscribed to each multicast stream to which its client devices are subscribed.

As is illustrated in FIG. 9B, as the primary controller for the AP 940, the controller 900 serves as the multicast subscriber for the client devices 960, 970, 980 and 990 because the client devices are associated with the AP 940. When the controller 900 decides to transmit a multicast stream to each subscribing client device via multicast, the controller 900 transmits the multicast stream to the AP 940 which in turn transmits a single copy of the multicast stream. In this situation, the client devices 960, 970, 980 and 990 all know the group key to decrypt the multicast stream. In this embodiment, the controllers 910 and 920 may stop receiving the multicast stream from the multicast router 930, or continue receiving the multicast stream if the multicast stream is to be forwarded to other access points (not shown).

Figure 9C:
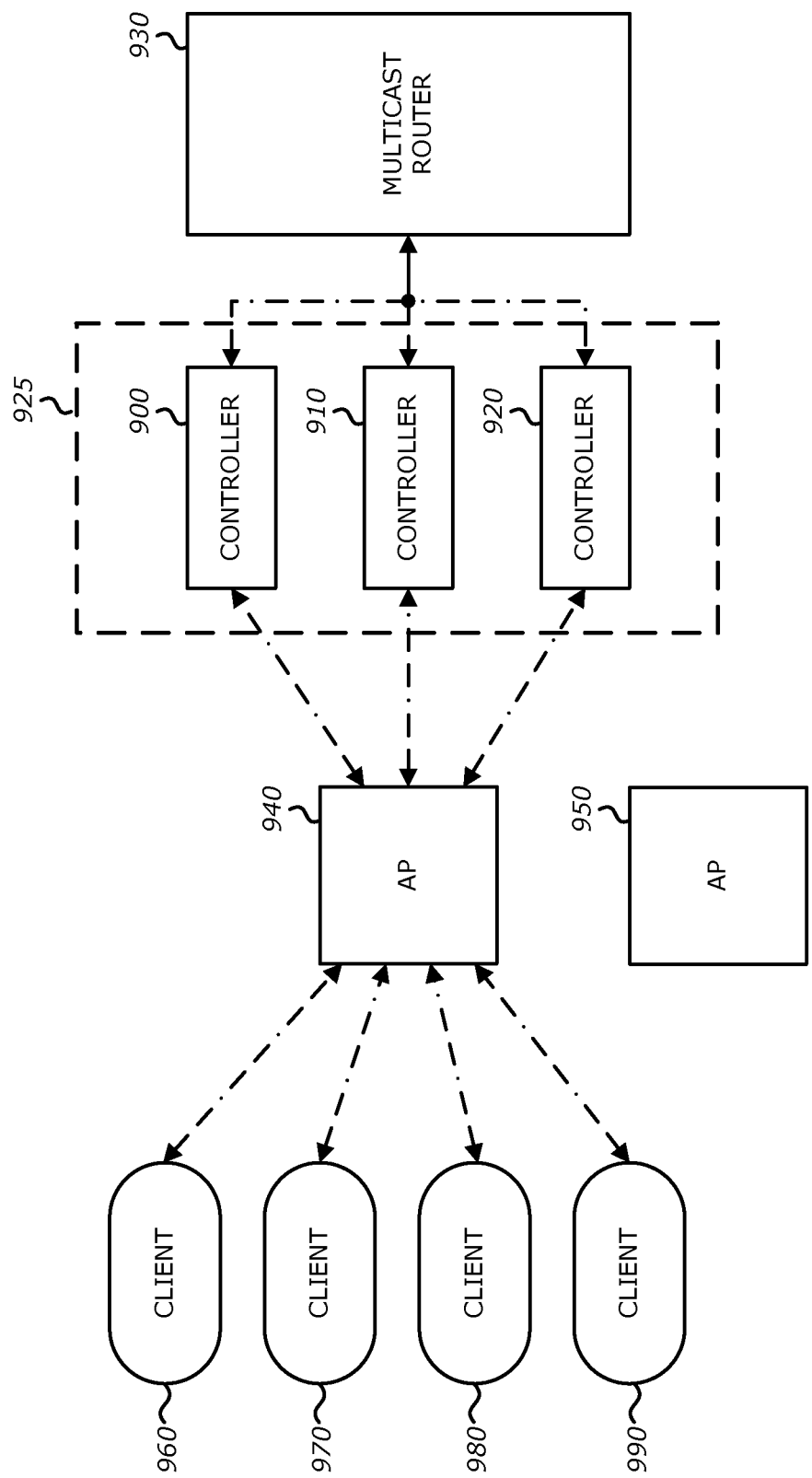
FIG. 9C is a second diagram of the exemplary network system of FIG. 9A illustrating the multicast transmission paths.

Referring to FIG. 9C, a second diagram of the exemplary network system of FIG. 9A illustrating the multicast transmission paths is provided. In an embodiment wherein the controller 900 decides to transmit a multicast stream to each subscribing client device via unicast, the controller 900 tells the primary controllers of the client devices associated with the AP 940 to convert the multicast stream to a unicast stream. Therefore, the controllers 910 and 920 would convert the multicast stream to unicast and transmit the unicast stream with a client device specific key because the controllers are the primary controller of the client device 970, and the client devices 980 and 990, respectively. It is illustrated in FIG. 9C that the AP 940 is receiving unicast transmission (converted from multicast) from the controllers 900, 910 and 920.

The cluster of controllers must also be able to handle the transmission of multicast streams when client devices roam from an AP assigned to a first controller to an AP assigned to a second controller within the cluster of controllers. When this occurs, the controller forwarding the multicast subscriptions of the roaming client device has changed.

Figure 9D:
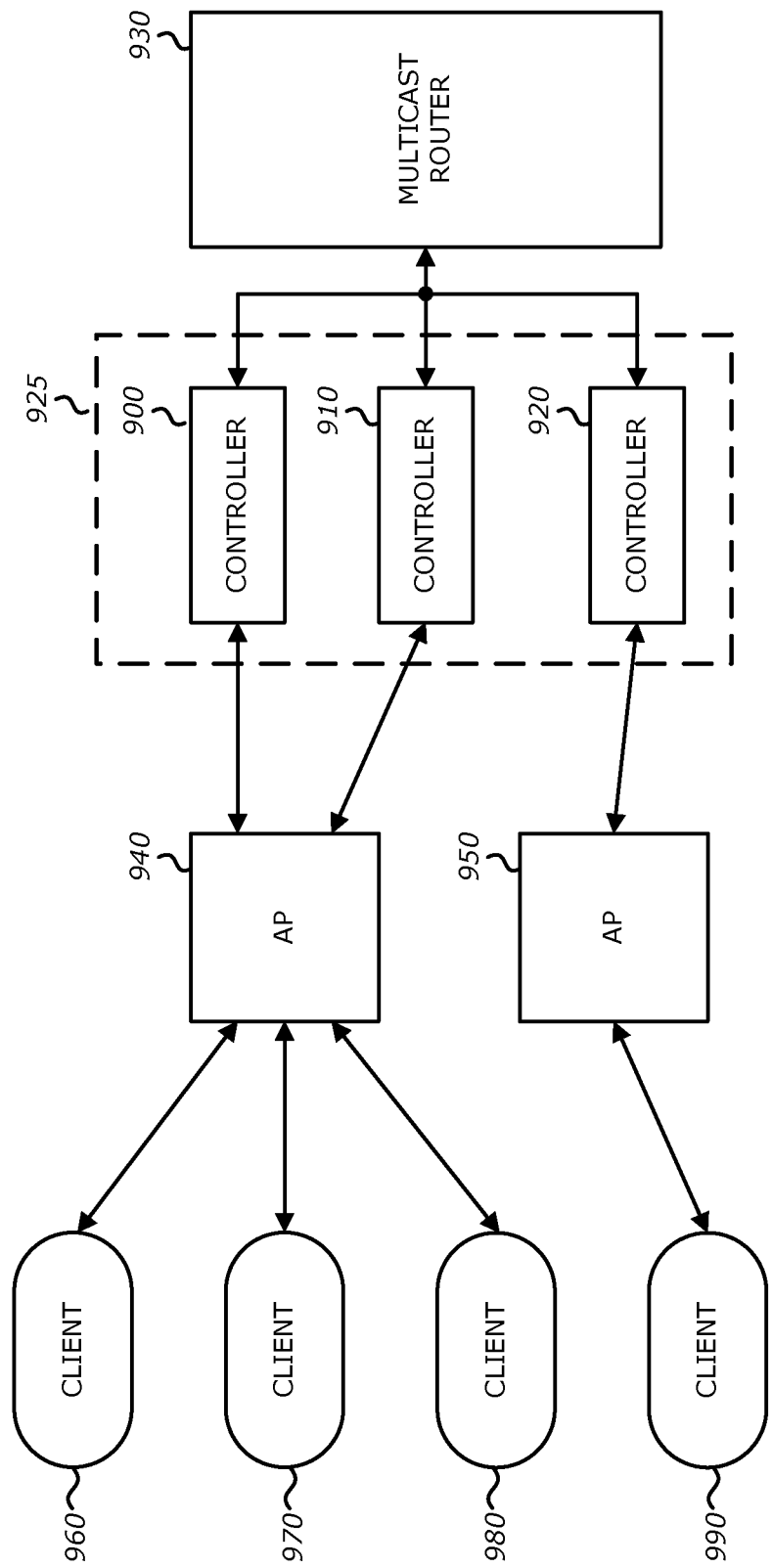
FIG. 9D is a diagram of the exemplary network system of FIG. 9A with a roaming client device.

Referring to FIG. 9D, a diagram of the exemplary network system of FIG. 9A now with a roaming client device is illustrated. In the embodiment of FIG. 9D, the client device 990 is now associated with the AP 950 which is assigned to the controller 920. In this situation, the controller 900 forwards the multicast subscriptions for the client devices 960, 970 and 980 while the controller 920 forwards the multicast subscriptions for the client device 990.

Once the client device 990 associates with the AP 950, the controller 920, as the primary controller of the client device 990, notifies the controller 900 that the client device 990 is now associated with the AP 950 and that the controller 900 no longer needs to forward the multicast subscriptions of the client device 990. The controller 900 will reconsider whether it should adjust how it is transmitting one or more multicast streams (i.e., via multicast or unicast) based on one or more factors including the number of client devices associated with the AP 940. As the primary controller of the client device 990, the controller 920 knows that it needs to manage the subscriptions of the client device 990 (because the client device 990 is associated with the AP 950 for which the controller 920 serves as the primary controller). In another embodiment, when a client device roams to and associates with an AP controlled by a controller other than the primary controller of the client device, the primary controller of the client device will notify the primary controller of the newly associated AP of the new association. The primary controller of the newly associated AP will then reconsider whether it should adjust how it is transmitting one or more multicast streams (i.e., via multicast or unicast).

VI. Handing Multicast Streaming when Controller Failure Occurs within a Cluster of Controllers With enhanced multicast proxy among a cluster of controllers, the state information regarding the multicast streams for each client device connected to the network should be maintained when one or more controllers within the cluster of controllers is placed in an inactive state (e.g., taken offline, placed in a suspended state, placed in a disabled state, etc.). A controller may be placed into an inactive state due to, among other things, controller failure, load balancing, or the performance of software upgrades to the controller. When a primary controller is in an inactive state, state information for each multicast streams is maintained by a standby controller (e.g., a secondary network device) for each controller within the cluster of controllers. The standby controller may be configured to back up (i) state information of one or more client devices and/or (ii) state information of one or more APs.

In some embodiments, the state information for a client device assigned to a primary controller may be backed up by a first standby controller and the state information for an AP assigned to the primary controller may be backed up by a second standby controller.

Referring to the discussion regarding FIG. 3A, a standby controller for each client device and AP maintains a duplicate copy of the state information of either one or more client devices or one or more APs. Therefore, when a controller within the cluster of controllers enters into an inactive state, the standby controller may, among other things, seamlessly continue the transmission of each multicast stream distributed by the offline controller.

Figure 10A:
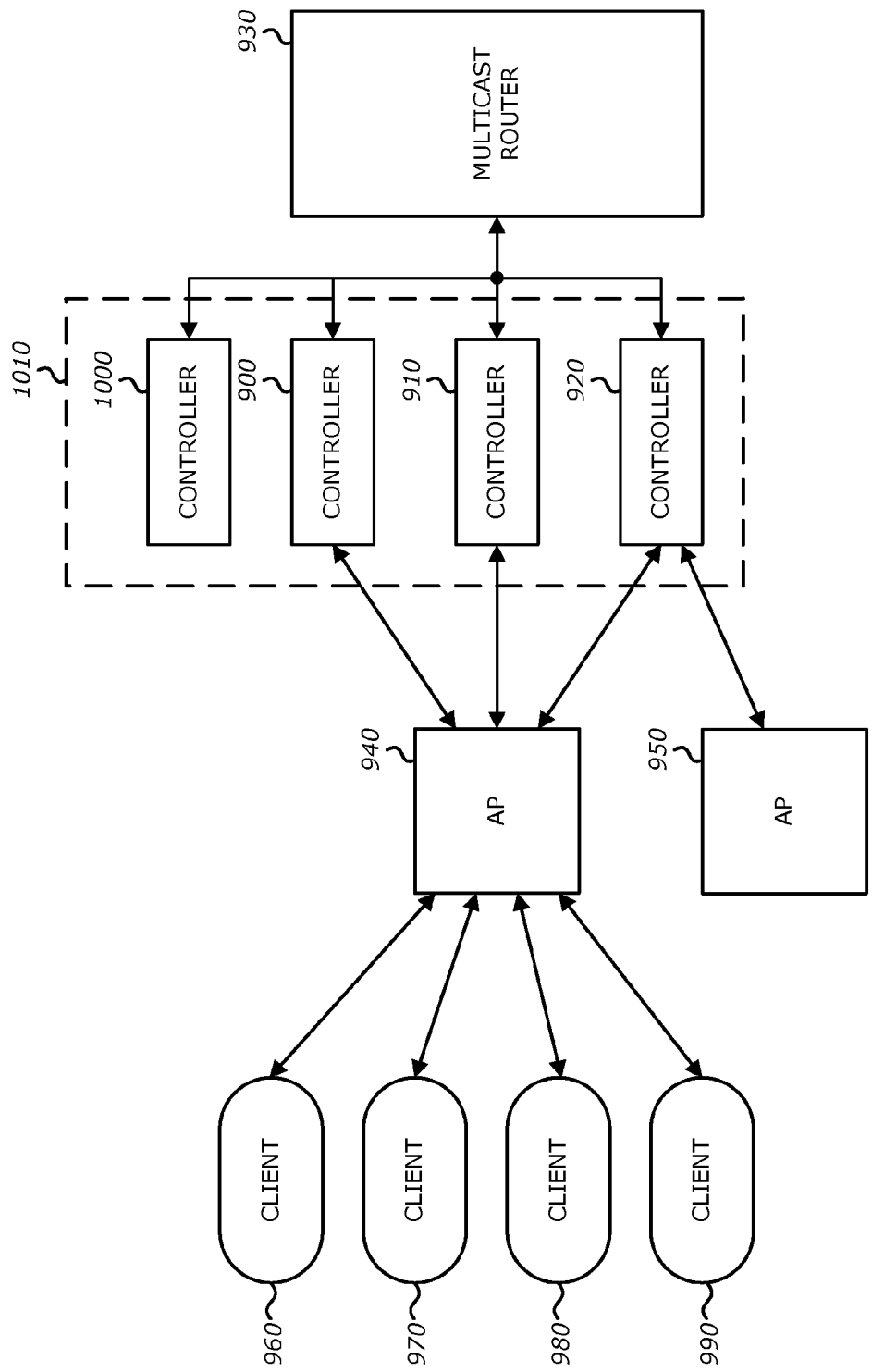
FIG. 10A is a diagram of an exemplary network system including a multicast router.

Referring to FIG. 10A, a diagram of an exemplary network system including a multicast router is illustrated. A cluster of controllers 1010 includes the controllers 900, 910, 920 and 1000. Each controller communicates with the multicast router 930. For this exemplary embodiment, the controller 900 serves as the primary controller for the AP 940 (the primary controller for the AP 940 may be referred to as its "Access Point Anchor Controller") and the client device 960 (the primary controller for the client device 960 may be referred to as its "User Anchor Controller"). The controller 910 serves as the primary controller for the client device 970 and as the standby controller for the client device 960 (according to the same manner as discussed regarding FIGS. 8A-8F). The controller 920 serves as the primary controller for the AP 950 and the client devices 980 and 990. The controller 1000 serves as the standby controller for the AP 940. In addition, the controller 1000 may communicate with other APs not shown and serve as the primary controller for one or more APs and/or client devices not shown.

In the embodiment shown, each of the controllers 900, 910, 920 and 1000 may subscribe to one or more multicast streams on behalf of their respective client devices. In some embodiments, the controller 900, as the primary controller for the AP 940, transmits all multicast streams to which the client devices 960-990 have subscribed to the AP 940. Thereafter, the AP 940 sends a multicast transmission of the multicast streams to the client devices 960-990. In an alternative embodiment, the multicast streams are transmitted as unicast streams from each controller 900, 910 and 920 to their associated client devices via the AP 940.

In the embodiment of FIG. 10A, the primary controller of the AP 940 and the primary controller of the client device 970 are different controllers (the controller 900 and the controller 910, respectively). In such an embodiment, the controller 900 and the controller 910 may communicate regarding the transmission of the multicast streams to which the client device 970 is subscribed. For example, the controller 900 may instruct the controller 910 to convert a multicast stream to a unicast stream and transmit the unicast stream directly to the client device 970. Alternatively, the controller 900 may communicate the set of current conditions of the transmission of one or more multicast streams (e.g., the current transmission mode of one or more multicast streams and/or the AP through which to transmit a unicast stream) to, among others, the controller 910.

Figure 10B:
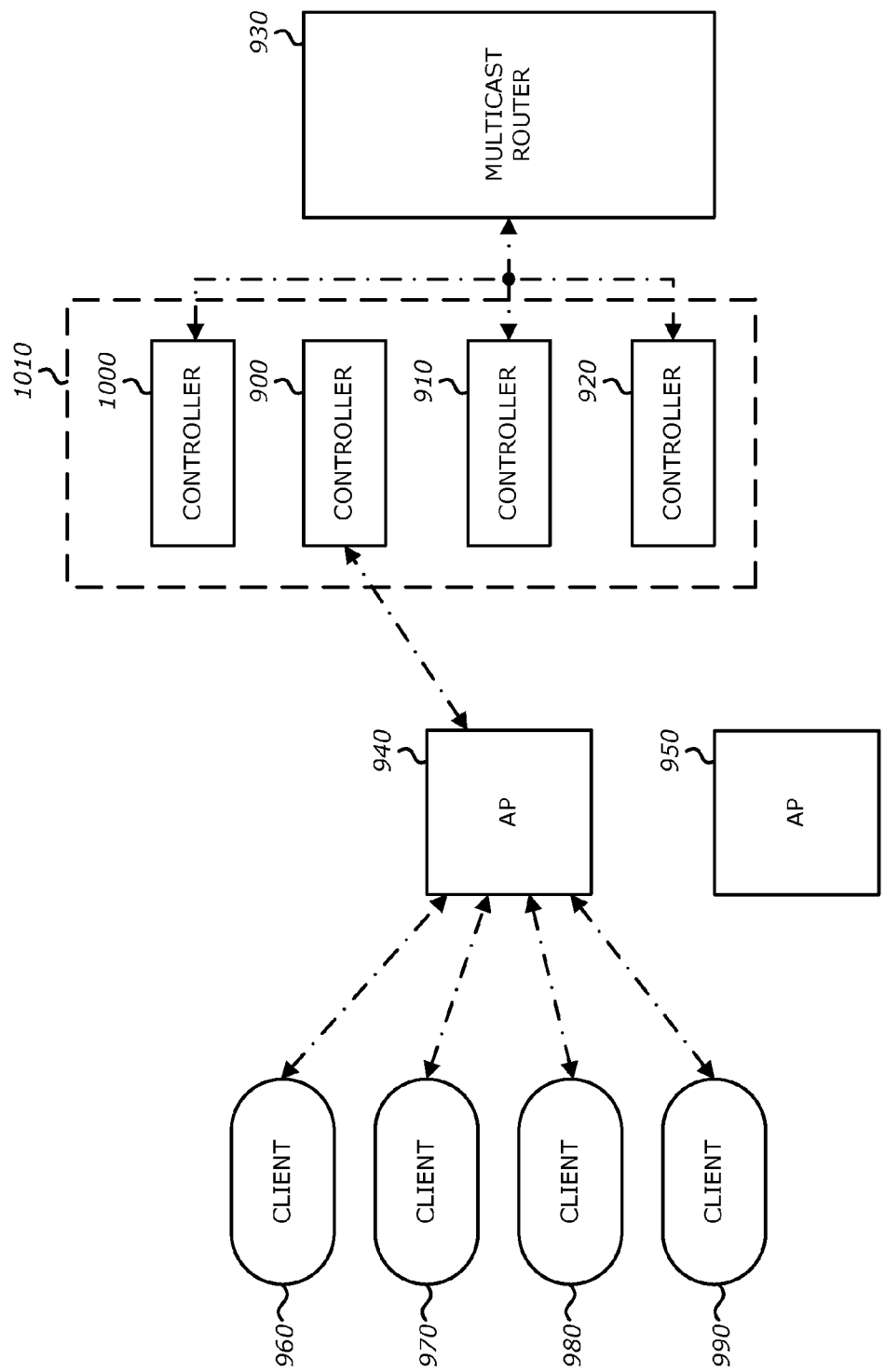
FIG. 10B is a diagram of the exemplary network system of FIG. 10A illustrating the multicast transmission paths (e.g., a data stream path).

Referring to FIG. 10B, a diagram of the exemplary network system of FIG. 10A illustrating the multicast transmission paths (e.g., a data stream path) is provided. Herein, the AP 940 is only receiving multicast transmission from the controller 900. In order to avoid the transmission of unnecessary copies of a single multicast stream over the network, the cluster of controllers 1010 utilizes the communication among the controllers. The cluster of controllers 1010 allows the primary controller of the AP with which one or more client devices are associated to be the multicast subscriber for the client devices associated with the AP and distribute the multicast stream(s).

As the standby controller to the controller 900, the controller 1000 maintains a copy of the state information also maintained by the controller 900. For example, as discussed above, state information may include, for example, authentication information, firewall session information, multicast information, gateway information, and/or optimization information for a particular client device. Regarding the multicast proxy, it is particularly important that the standby controller (e.g., the controller 1000) maintains the multicast information which may include, but is not limited or restricted to, which client devices are associated with the AP 940 (because the controller 900 serves as the primary controller for the AP 940), the multicast streams to which each of the associated client devices are subscribed and/or the current state of transmission for each of the multicast streams (e.g., unicast or multicast as discussed above).

The controller 1000 maintains a copy of the state information maintained by the controller 900 by syncing its copy of the state information at various times or based on certain occurrences. Examples of points at which the controller 1000 may sync its copy of the state information maintained by the controller 900 include, but are not limited or restricted to, at the expiration of predetermined time intervals, when a client device subscribes to a new multicast stream (e.g., based on a notification from the controller 900), when a client device unsubscribes from a multicast stream, when a client device moves from a first AP to a second AP, immediately following an instruction for the controller 900 to be taken offline and/or immediately following a load balancing instruction. The state information may be maintained by the controller 1000 in a table format, including, among others, a hash table or a linked list.

Figure 10C:
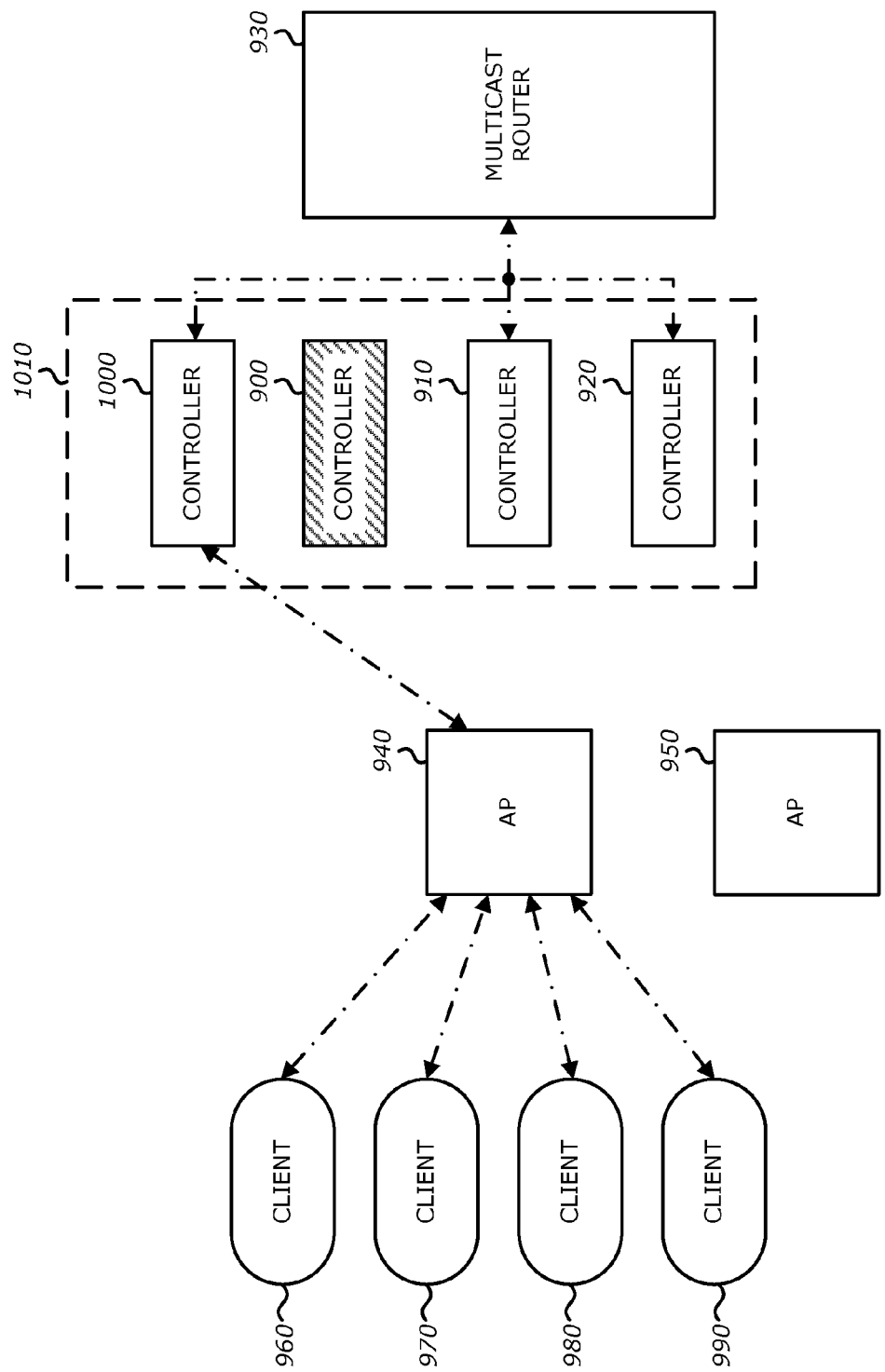
FIG. 10C is a diagram of the exemplary network system of FIG. 10B illustrating the multicast transmission paths (e.g., a data stream path) wherein the controller 900 is in an inactive state.

Referring to FIG. 10C, a diagram of the exemplary network system of FIG. 10B illustrating the multicast transmission paths (e.g., a data stream path) wherein the controller 900 is in an inactive state is shown. More specifically, FIG. 10C illustrates the multicast transmission paths in the exemplary network system of FIG. 10B when the controller 900 is in an inactive state and the controller 1000 (e.g., previously the standby controller to the controller 900) has seamlessly taken over transmitting the multicast streams to the AP 940 for the controller 900. For the embodiment, the one or more multicast streams to which the client devices 960-990 have subscribed are each being transmitted via multicast by the controller 1000 through the AP 940. In addition, the controller 900 is offline as illustrated by the shading present in the box representing the controller 900. Furthermore, the controller 900 is no longer receiving any multicast streams from the multicast router 930.

When the controller 900 enters into an inactive state, the controller 1000, as the standby controller for the AP 940, subscribes to the multicast streams subscribed to by the client devices 960-990 and takes over transmitting the multicast streams to the AP 940. The controller 1000 also begins communicating with the primary controllers of the client devices 960-990 regarding the transmission of the multicast streams. For example, when the controller 900 enters an inactive state (e.g., is taken offline), the controller 1000 will begin communicating with the controller 910, as the primary controller of the client device 970, regarding the transmission of the multicast streams to which the client device 970 is subscribed.

As discussed above, the controller 900 may have been offline for a variety of reasons including, but not limited or restricted to, failure of the controller 900 or the controller 900 being purposefully taken offline by, for example, a network administer so software upgrades may be performed on the controller 900. In an alternative embodiment, the controller 1000 may take over for the controller 900 as primary controller of the AP 940 when, for example, the managing controller of the cluster of controllers issues a load balancing command that requires the controller 1000 to begin multicast transmission to the AP 940 and allow the controller 900 to take on other responsibilities within the cluster of controllers 1010. The controllers within the cluster of controllers 1010 may determine that a controller, such as, the controller 900, for example, has gone offline by the lack of a reception of a heartbeat from the controller 900. Alternatively, the network administer may propagate a notification to the controllers within the cluster of controllers regarding the controller 900 being offline.

In at least one embodiment, upon detecting that the controller 900 has entered into an inactive state, the controller 1000, as the standby controller for the AP 940, may notify the other controllers within the cluster of controllers 1010 that the controller 900 is in an inactive state and/or that it has assumed the multicast stream transmission responsibilities of the controller 900. In addition to transmitting the same multicast streams to the AP 940 as the controller 900 was prior to entering an inactive state, the controller 1000 may refrain from transmitting one or more multicast streams to the AP 940 that the controller 900 refrained from transmitting.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by a hardware processor, causes performance of operations comprising:
   transmitting, between a first networking device and a second networking device, a set of current conditions for coordinating transmission of a multicast stream to an access point used by the first networking device, wherein the transmission of the multicast stream is coordinated by dynamically switching between the first networking device and the second networking device when transmitting the multicast stream to the access point;
   detecting, by the first networking device, failure of the second networking device responsive to detecting failure of the second networking device;
   transmitting, between the first networking device and a third networking device, that set of current conditions for coordinating transmission of the multicast stream to the access point, wherein coordinating the transmission by the first networking device and the third networking device comprises dynamically switching between the first networking device and the third networking device when transmitting the multicast stream to the access point, wherein the third networking device initiates the coordinating of the transmission of the multicast stream with the first networking device in response to failure of the second networking device; and
   controlling multicast streams to client devices via the access point by the secondary networking device, wherein the set of current conditions comprises a number of client devices subscribing to the multicast stream that are associated with the access point.

2. The medium of claim 1, wherein prior to failure of the second networking device, the third networking device is configured as a back-up networking device for the second networking device.

3. The medium of claim 1, wherein the first networking device is a User Anchor Controller and the second networking device is an Access Point Anchor Controller.

4. The medium of claim 1, wherein the operations further comprise the first networking device initiating the coordinating of the transmission of the multicast stream with the third networking device in response to failure of the second networking device.

5. A method comprising:
   transmitting, between a first networking device and a second networking device, a set of current conditions for coordinating transmission of a multicast stream to an access point used by the first networking device, wherein the transmission of the multicast stream is coordinated by dynamically switching between the first networking device and the second networking device when transmitting the multicast stream to the access point;

detecting, by the first networking device, failure of the second networking device responsive to detecting failure of the second networking device;

transmitting, between the first networking device and a third networking device, that set of current conditions for coordinating transmission of the multicast stream to the access point, wherein coordinating the transmission by the first networking device and the third networking device comprises dynamically switching between the first networking device and the third networking device when transmitting the multicast stream to the access point, wherein the third networking device initiates the coordinating of the transmission of the multicast stream with the first networking device in response to failure of the second networking device; and controlling multicast streams to client devices via the access point by the secondary networking device, wherein the set of current conditions comprises a number of client devices subscribing to the multicast stream that are associated with the access point.

6. The method of claim 5, wherein prior to failure of the second networking device, the third networking device is configured as a back-up networking device for the second networking device.

7. The method of claim 5, wherein the first networking device is a User Anchor Controller and the second networking device is an Access Point Anchor Controller.

8. The method of claim 5, wherein the operations further comprise the first networking device initiating the coordinating of the transmission of the multicast stream with the third networking device in response to failure of the second networking device.

9. A system comprising:
a memory;
a first networking device comprising a first hardware processor;
a second networking device comprising a second hardware processor;
a third networking device comprising a third hardware processor, wherein at least one of the first hardware processor, the second hardware processor, and the third hardware processor executes instructions from the memory to:

transmit, between a first networking device and a second networking device, a set of current conditions for coordinating transmission of a multicast stream to an access point used by the first networking device, wherein the transmission of the multicast stream is coordinated by dynamically switching between the first networking device and the second networking device when transmitting the multicast stream to the access point;

detect, by the first networking device, failure of the second networking device responsive to detecting failure of the second networking device;

transmit, between the first networking device and a third networking device, that set of current conditions for coordinating transmission of the multicast stream to the access point, wherein coordinating the transmission by the first networking device and the third networking device comprises dynamically switching between the first networking device and the third networking device when transmitting the multicast stream to the access point, wherein the third networking device initiates the coordinating of the transmission of the multicast stream with the first networking device in response to failure of the second networking device; and control multicast streams to client devices via the access point by the secondary networking device, wherein the set of current conditions comprises a number of client devices subscribing to the multicast stream that are associated with the access point.

10. The system of claim 9, wherein prior to failure of the second networking device, the third networking device is configured as a back-up networking device for the second networking device.

11. The system of claim 9, wherein the first networking device is a User Anchor Controller and the second networking device is an Access Point Anchor Controller.

12. The system of claim 9, wherein the operations further comprise the first networking device initiating the coordinating of the transmission of the multicast stream with the third networking device in response to failure of the second networking device.

* * * * *